United States Patent
Yoneyama et al.

(10) Patent No.: US 8,908,082 B2
(45) Date of Patent: Dec. 9, 2014

(54) IMAGING DEVICE AND MOBILE INFORMATION TERMINAL

(75) Inventors: Kazuya Yoneyama, Saitama (JP);
Yoshikazu Shinohara, Saitama (JP);
Takayuki Noda, Saitama (JP);
Tatsuyuki Ogino, Saitama (JP); Ryoko Tomioka, Saitama (JP)

(73) Assignee: Fujifilm Corporation, Tokyo (JP)

( * ) Notice: Subject to any disclaimer, the term of this patent is extended or adjusted under 35 U.S.C. 154(b) by 495 days.

(21) Appl. No.: 13/225,669

(22) Filed: Sep. 6, 2011

(65) Prior Publication Data
US 2012/0057071 A1  Mar. 8, 2012

(30) Foreign Application Priority Data
Sep. 7, 2010 (JP) ................. 2010-200160

(51) Int. Cl.
| | |
|---|---|
| H04N 5/232 | (2006.01) |
| H04N 5/225 | (2006.01) |
| G02B 9/00 | (2006.01) |
| G02B 17/00 | (2006.01) |
| G02B 13/00 | (2006.01) |
| H04N 1/00 | (2006.01) |
| H04N 9/04 | (2006.01) |

(52) U.S. Cl.
CPC .......... G02B 13/004 (2013.01); *H04N 1/00307* (2013.01); *H04N 9/045* (2013.01)

USPC .......... 348/345; 348/335; 359/733; 359/734; 359/735; 359/740

(58) Field of Classification Search
USPC .......... 348/345, 335; 359/740, 733, 734, 735, 359/736
See application file for complete search history.

(56) References Cited

U.S. PATENT DOCUMENTS

| | | | |
|---|---|---|---|
| 6,927,925 B2* | 8/2005 | Amanai | 359/740 |
| 8,004,777 B2* | 8/2011 | Sano et al. | 359/773 |
| 2007/0070525 A1 | 3/2007 | Taniyama | |
| 2008/0180814 A1 | 7/2008 | Kawasaki | |
| 2008/0266676 A1 | 10/2008 | Yasuhiko | |
| 2010/0062559 A1* | 3/2010 | Park et al. | 438/65 |

FOREIGN PATENT DOCUMENTS

| | | |
|---|---|---|
| JP | 2007-122007 | 5/2007 |
| JP | 2008-185687 | 8/2008 |
| JP | 2008-268946 | 11/2008 |

* cited by examiner

*Primary Examiner* — Twyler Haskins
*Assistant Examiner* — Quang Le
(74) *Attorney, Agent, or Firm* — Young & Thompson

(57) ABSTRACT

An imaging device with a short length and small aberration is provided. A total length D of an image-forming optical system is less than 3.6 mm. A maximum incidence angle of a principle ray on an image forming plane exceeds 33°. Conditions f/fL<−1.50 or f/fL<−0.9, and D/f<1.10 are satisfied where f denotes a focal length of the entire image-forming optical system and fL denotes a focal length of a last lens.

18 Claims, 16 Drawing Sheets

SPHERICAL
ABERRATION

ASTIGMATISM

DISTORTION

SPHERICAL ABERRATION

ASTIGMATISM

DISTORTION

SPHERICAL
ABERRATION

ASTIGMATISM

DISTORTION

SPHERICAL
ABERRATION

ASTIGMATISM

DISTORTION

SPHERICAL
ABERRATION

ASTIGMATISM

DISTORTION

FIG. 23
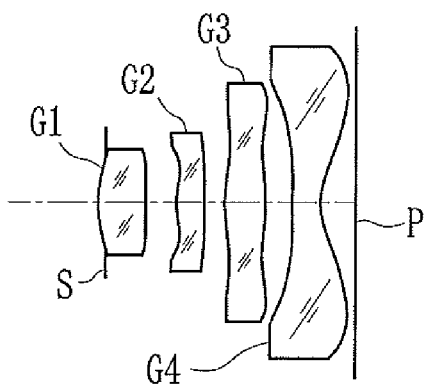
FIG. 24
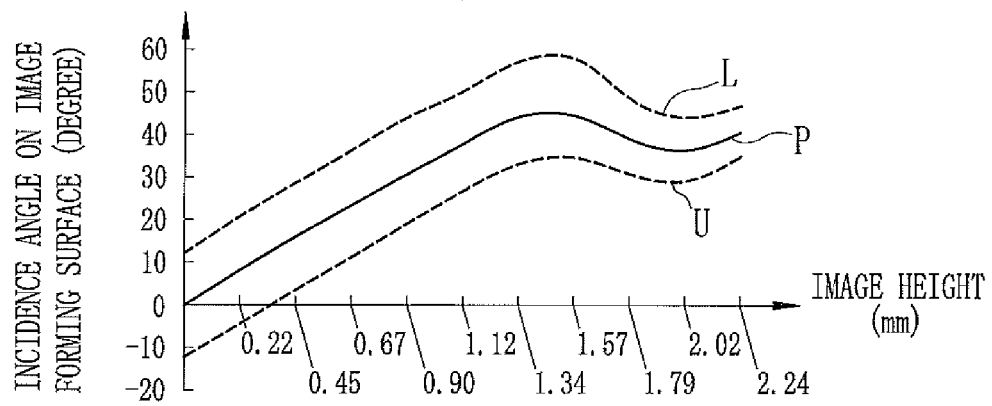
FIG. 25A      FIG. 25B      FIG. 25C
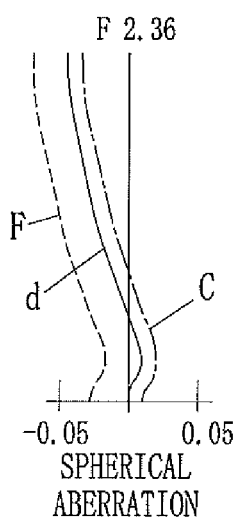
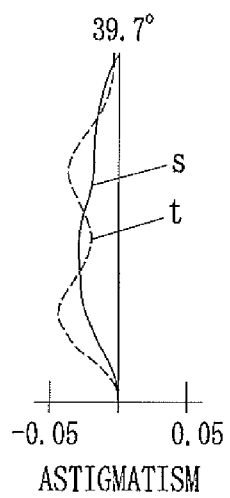
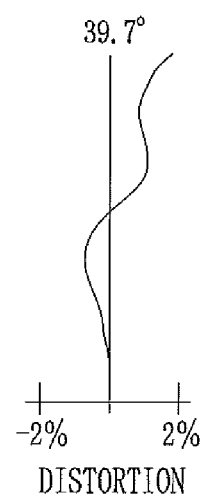

SPHERICAL
ABERRATION

ASTIGMATISM

DISTORTION

SPHERICAL
ABERRATION

ASTIGMATISM

DISTORTION

FIG. 32
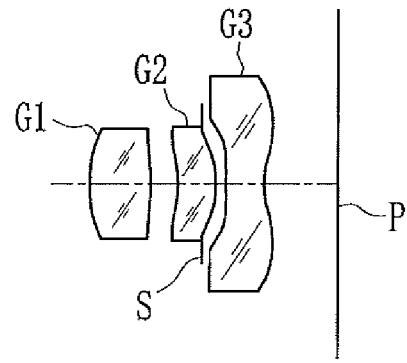
FIG. 33
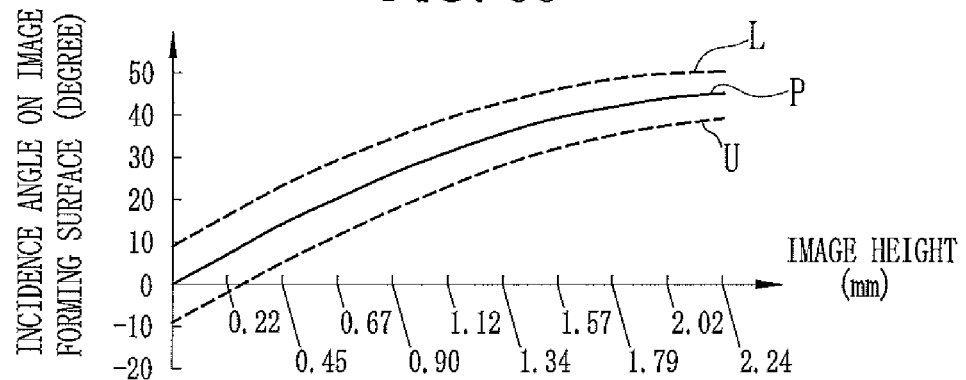
FIG. 34A      FIG. 34B      FIG. 34C
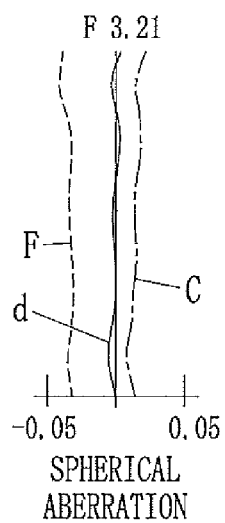
SPHERICAL
ABERRATION
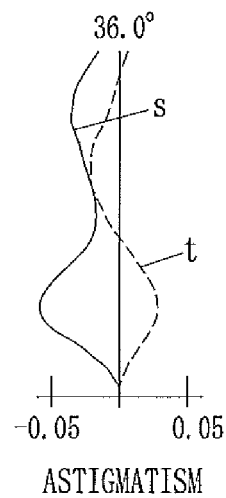
ASTIGMATISM
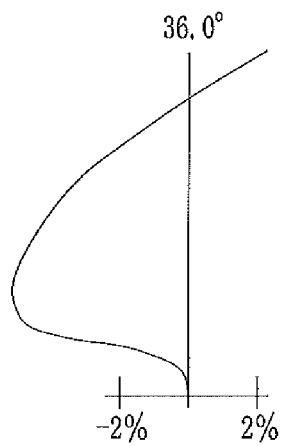
DISTORTION

SPHERICAL
ABERRATION

ASTIGMATISM

DISTORTION

SPHERICAL
ABERRATION

ASTIGMATISM

DISTORTION

SPHERICAL
ABERRATION

ASTIGMATISM

DISTORTION

IMAGING DEVICE AND MOBILE INFORMATION TERMINAL

BACKGROUND OF THE INVENTION

1. Field of the Invention

The present invention relates to an imaging device provided with an image-forming optical system and an image sensor, and a mobile information terminal incorporating the imaging device.

2. Description Related to the Prior Art

A digital camera has been incorporated into various mobile devices such as a mobile phone and a PDA. Furthermore, the digital camera has been widely used for a videophone and a vehicle camera or an onboard camera allowing a driver to monitor an image of the inside or the outside of a vehicle. The digital camera has an imaging device and a peripheral circuit device. The imaging device is a unit of an image-forming optical system and a solid state image sensor. The solid state image sensor photoelectrically converts a subject image formed by the image-forming optical system. The peripheral circuit device drives the solid state image sensor and reads an imaging signal therefrom and performs various signal processes to the imaging signal to obtain a digital image signal. The peripheral circuit device then stores the digital image signal.

For example, to incorporate the digital camera into the mobile phone or the PDA commonly used as the mobile information terminal, it is relatively easy to reduce a width of the peripheral circuit device using various mounting techniques. On the other hand, it is difficult to reduce a width of the imaging device without affecting its optical performance. It is possible to reduce the width of the imaging device simply by reducing a total length of the image-forming optical system. However, when the image-forming optical system has a short width, an incidence angle of a principal ray on each point, on an image forming plane, away from an optical axis becomes larger than that in an image-forming optical system with a long length. This is due to a short geometric distance between an aperture stop plane and an image forming plane, and is unavoidable due to optical design limitations.

On the other hand, a front side illumination CMOS sensor commonly used as the solid state image sensor has a microlens arranged on its incident surface. Thereby, aperture efficiency of each pixel is improved to direct as much image-forming light as possible to its photoelectric conversion portion. Thus, the aperture efficiency and photoelectric conversion efficiency of the front side illumination CMOS sensor are improved compared to an image sensor with no microlens. The front side illumination CMOS sensor photoelectrically converts the normal incident light efficiently. However, because the photoelectric conversion portion is located under a wiring layer, obliquely incident light is reflected by the wiring layer before it reaches the photoelectric conversion portion or leaks to adjacent pixels. Thus, the obliquely incident light cannot contribute to the photoelectric conversion of the pixel. Each pixel has the highest photoelectric conversion efficiency when light is incident vertically on the imaging surface. The photoelectric conversion efficiency of light incident at an angle of the order of 20° is drastically reduced to the order of 35%, taking the conversion efficiency of the normal incident light as 100%. When the incidence angle exceeds the order of 30°, most of the light is reflected or blocked by the wiring layer and the like or leaks to adjacent pixels. Thereby, the photoelectric conversion efficiency is reduced to 5% of that of the normal incidence.

As described above, because the photoelectric conversion portion is located under the wiring layer in each pixel of the front side illumination CMOS sensor, a tolerance range of a light diffusion angle is small. When an angle of incidence (incidence angle) is larger than the vertical incidence angle (=0°), light leaks to the adjacent pixels immediately. Thus, the sensitivity is reduced. Light with a large incidence angle increases as being closer to the periphery of the image. As a result, the light available for the photoelectric conversion is reduced in the periphery of the image. Thus, the peripheral area of an image becomes relatively dark compared to a screen center thereof. In other words, the CMOS sensor cannot reproduce an image based on the brightness indicated by the aperture efficiency and supposed to be ensured by the optical system. Generally, the image with dark peripheral portion is corrected by image processing afterwards. However, the correction causes deterioration of SN ratio. When an extremely dark image is corrected excessively, the deterioration of the SN ratio exceeds a tolerable range and thus rendering the image unusable. In the color CMOS sensor, the light leaking to the adjacent pixels causes color mixture. The color mixture can also be corrected in the image processing. This correction also causes the deterioration of the SN ratio. When an image with extreme color mixture is corrected excessively, the deterioration of the SN ratio exceeds a tolerable range and thus rendering the image unusable. For these reasons, the front side illumination CMOS sensor is not suitable for a small imaging device.

To correct the incidence angle of the principal ray in the periphery of the image, a microlens pitch may be set smaller than a pixel pitch (that is, the so-called scaling). Ideally, the angle of principal ray is corrected to zero which is equivalent to vertical incident angle. Thereby, darkening of the illumination in the periphery of the image is reduced. However, in reality, the scaling is not perfect and sufficient to solve the problem. The microlens has its aberration which causes light loss. Also, microlens scaling is not perfectly matched with optics because chief ray angle variation is not linear along with image height. This imperfection becomes significant as principal ray angle becomes larger. For this reason, an optical system for use in the current imaging device is optically designed such that the incident angle of principal ray on the imaging surface is limited to approximately 30° or less as disclosed in U.S. Patent Application Publication No. 2007/0070525 (corresponding to Japanese Patent Laid-Open Publication No. 2007-122007), U.S. Patent Application Publication No. 2008/0266676 (corresponding to Japanese Patent Laid-Open Publication No. 2008-268946), and U.S. Patent Application Publication No. 2008/0180814 (corresponding to Japanese Patent Laid-Open Publication No. 2008-185687).

Due to structural limitation to the solid state image sensor, the conventional imaging optical system requires to set the maximum incidence angle of the principal ray to be the order of 30° on the image forming plane of the optical system. The imaging forming plane of the optical system coincides with the incident surface of the solid state image sensor. The total length of the optical system is 4 mm or more as disclosed in the U.S. Patent Application Publication No. 2007/0070525 and the No. 2008/0266676. Accordingly, further thinning of the imaging device is desired. A total length (with the equivalent air distance or reduced distance) of the optical system disclosed in the U.S. Application Publication No. 2008/0180814 is reduced to the order of 3.2 mm. However, the incidence angle of the principal ray on the image forming plane is required to be less than the order of 30°, which results in insufficient resolution and small image size. Thus, the conventional image sensor has limited application and lacks versatility.

SUMMARY OF THE INVENTION

A main object of the present invention is to provide an imaging device having a small size, specifically, reduced in thickness (a distance between a forwardmost plane and an incident plane of an image-forming optical system) to facilitate its installation to a mobile information terminal.

Another object of the present invention is to provide an imaging device with an excellent optical performance.

In order to achieve the above and other objects, an imaging device of the present invention includes an image-forming optical system composed of two or more lenses and a solid state image sensor for capturing an image formed on an image forming plane of the image-forming optical system. A distance between a forwardmost plane and the image forming plane of the image-forming optical system is less than 3.6 mm. A maximum incidence angle of a principal ray incident on the image forming plane exceeds 33°. When the maximum incidence angle of the principal ray exceeds 33°, the total length of the image-forming optical system can be further shortened while various aberrations are suppressed. Thereby, a distance between a forwardmost plane and the image forming plane of the image-forming optical system can be reduced to the order of 3.3 mm.

More preferably, when the maximum incidence angle of the principal ray exceeds 45°, the total length of the image-forming optical system can be further shortened while various aberrations are suppressed. Thereby, a distance between a forwardmost plane and the image forming plane of the image-forming optical system can be reduced to the order of 3.0 mm.

It is preferable that $f/fL<-1.50$ is satisfied where "f" denotes a focal length of the entire image-forming optical system and "fL" denotes a focal length of a last lens. The forwardmost plane of the image-forming optical system is not limited to a lens surface. The forwardmost plane may be an aperture stop plane. When a parallel flat plate with no power such as a filter plate is included in the image-forming optical system, the thickness of the parallel flat plate is converted into its equivalent air distance or reduced distance, to calculate the total distance between the forwardmost plane and the image forming plane.

In a preferred embodiment of the present invention, $f/fL<-1.50$ and $D/f<1.10$ are satisfied. "D" denotes the distance between a forwardmost plane and the image forming plane of the image-forming optical system. "f" denotes the a focal length of the entire image-forming optical system. "fL" denotes a focal length of a last lens. With a lens configuration composed of three or four lenses in total, the distance D is less than 3.6 mm.

It is most preferable that the solid state image sensor used in the present invention has a function to photoelectrically convert the subject light with the use of the organic photoelectric conversion layer. In this case, the solid state image sensor allows the maximum incidence angle of light at the image forming surface to exceed 33°, and eliminates the need for the IR cut filter in the image-forming optical system. To increase the maximum incidence angle greater than 33°, the solid state image sensor of the back side illumination type may be used. The above described imaging device can be incorporated suitably into the mobile information terminal, notably a mobile phone. The imaging device can be incorporated into an endoscope apparatus, a personal computer, a TV, and the like. The imaging device can be widely used for human detection and image verification.

The imaging device of the present invention has excellent image-forming performance even if the maximum incidence angle of the principal light on the image forming plane is increased compared to the conventional device, while being miniaturized. Accordingly, the imaging device of the present invention is used in various apparatuses such as household electrical appliances and mobile information terminals.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 23 shows a lens configuration of an image-forming optical system according to an embodiment 7 of the present invention;

FIG. 24 is a graph showing a relation between an image height on an image forming plane and an incidence angle according to the embodiment 7;

FIG. 25A shows spherical aberration of the image-forming optical system according to the embodiment 7;

FIG. 25B shows astigmatism of the image-forming optical system according to the embodiment 7;

FIG. 25C shows distortion of the image-forming optical system according to the embodiment 7;

FIG. 28B shows distortion of the image-forming optical system according to the embodiment 8;

FIG. 32 shows a lens configuration of an image-forming optical system according to an embodiment 10 of the present invention;

FIG. 33 shows a graph showing a relation between an image height on an image forming plane and an incidence angle according to the embodiment 10;

FIG. 34A shows spherical aberration of the image-forming optical system according to the embodiment 10;

FIG. 34B shows astigmatism of the image-forming optical system according to the embodiment 10;

FIG. 34C shows distortion of the image-forming optical system according to an embodiment 10;

DESCRIPTION OF THE PREFERRED EMBODIMENTS

Figures 1A, 1B:
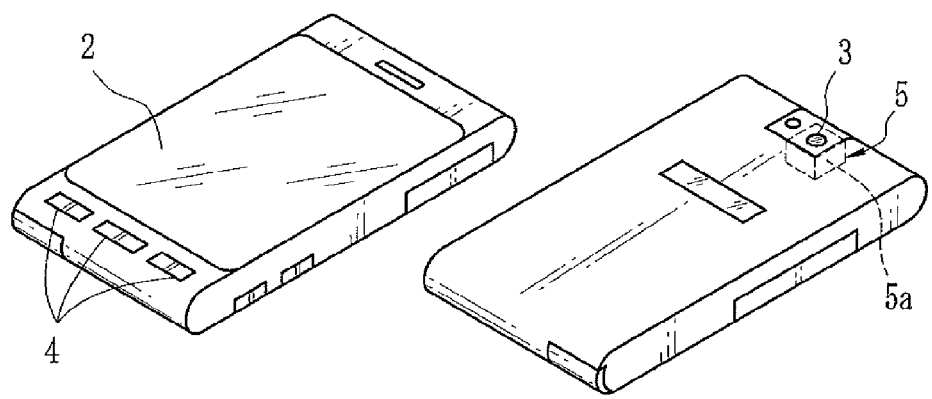
FIG. 1A is a front view of a mobile phone incorporating an imaging device of the present invention.
FIG. 1B is a back view of the mobile phone shown in FIG. 1A.

In FIG. 1A showing a mobile phone, an operation menu is displayed on a display panel 2 upon input operation using an operating section 4. The operating section 4 is provided below the display panel 2. The display panel 2 is a touch panel. An operation such as making a phone call is performed by tapping onscreen icons displayed on the display panel 2.

In FIG. 1B, a capture window 3 is provided on a back face of the mobile phone. The mobile phone incorporates an imaging device 5 behind the capture window 3. When the mobile phone is set to a camera mode by tapping the display panel 2, an image captured by the imaging device 5 through the capture window 3 is displayed as a through image realtime on the display panel 2. An operator determines framing while looking at the through image. With a release operation, a still image is captured. In the camera mode, when a video mode is selected, a moving image is captured. The imaging device 5 is composed of a solid state image sensor and an image-forming optical system, in a substantially rectangular casing 5a. The solid state image sensor is mounted on a flexible substrate in a bare-chip form. The image-forming optical system is positioned in front of the solid state image sensor. The total thickness of the solid state image sensor including the casing 5a is in the order of several mm to 8 mm. The imaging device 5 is incorporated into a housing of the mobile phone.

The solid state image sensor for use in the imaging device is composed of a CMOS image sensor (CMOS sensor) that photoelectrically converts subject light incident through the image-forming optical system. An organic CMOS sensor disclosed in, for example, "FUJIFILM RESEARCH & DEVELOPMENT" (No. 55-2010) is used as the CMOS sensor. In the present invention, a back side illumination CMOS sensor may be used to improve the sensitivity.

Figures 2A, 2B, 2C:
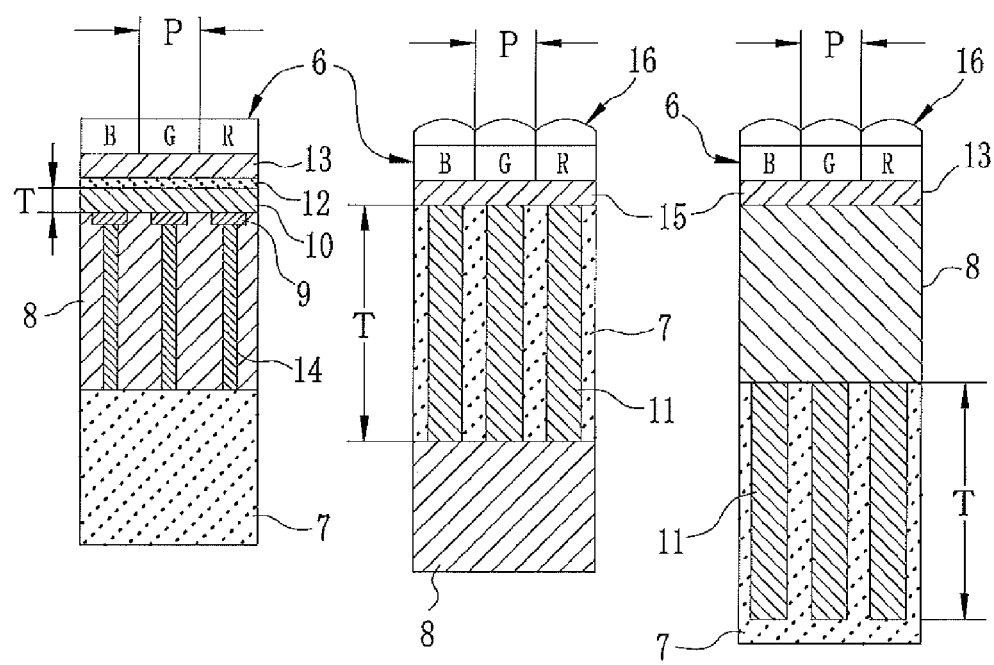
FIG. 2A is a schematic cross-sectional view of an organic CMOS sensor.
FIG. 2B is a schematic cross-sectional view of a back side illumination CMOS sensor.
FIG. 2C is a schematic cross-sectional view of a front side illumination CMOS sensor.

In FIG. 2A showing the organic CMOS sensor, a microcolor filter layer 6 is composed of a blue transmission filter, a green transmission filter, and a red transmission filter arranged in a predetermined pattern, for example, a Bayer arrangement. "P" in FIGS. 2A to 2C corresponds to one pixel.

In the organic CMOS sensor, a wiring layer 8 is provided above a semiconductor substrate 7 provided with a read-out circuit (not shown). A pixel electrode 9 is provided above the wiring layer 8. An organic photoelectric conversion layer 10 is provided above the pixel electrode 9. A transparent counter electrode 12 is provided above the organic photoelectric conversion layer 10. The wiring layer 8 includes an electrical network such as a switching circuit or an amplification circuit for reading an imaging signal obtained on a pixel-by-pixel basis via the pixel electrode 9. The circuits are electrically connected to each other via a connection portion 14 provided in the wiring layer 8. A transparent protection layer 13 is formed above the counter electrode 12. The microcolor filter layer 6 is formed on the protection layer 13.

The back side illumination CMOS sensor shown in FIG. 2B is provided with a photoelectric conversion portion 11 on a pixel-by-pixel basis in the semiconductor substrate 7. The photoelectric conversion portion 11 is composed of silicon photodiode. Above the photoelectric conversion portion 11, a passivation film 15 and the microcolor filter layer 6 are formed in this order from the photoelectric conversion portion 11. A microlens array 16 is formed on the microcolor filter layer 6 such that the microlenses of the microlens array 16 cover the pixels on the microcolor filter layer 6, respectively. The wiring layer 8 is provided under the photoelectric conversion portion 11 (opposite to an incident surface). The wiring layer 8 includes the switching circuit for reading the imaging signal on a pixel-by-pixel basis.

The front side illumination CMOS sensor shown in FIG. 2C is provided with the photoelectric conversion portion 11, composed of silicon photodiode, in the semiconductor substrate 7. Above the semiconductor substrate 7, the wiring layer 8, the passivation film 15, and the microcolor filter layer 6 are provided in this order from the semiconductor substrate 7. The microlens array 16 is formed on the microcolor filter layer 6 such that microlenses of the microlens array 16 cover the pixels on the microcolor filter layer 6, respectively.

As can be seen from FIG. 2A to FIG. 2C, in each of the organic CMOS sensor and back side illumination CMOS sensor, the organic photoelectric conversion layer 10 or the photoelectric conversion portion 11 is provided above the wiring layer 8. Each of a top surface of the organic photoelectric conversion layer 10 and a top surface of the photoelectric conversion portion 11 is a light receiving surface located close to an incident surface of the corresponding CMOS sensor. On the other hand, in the front side illumination CMOS sensor, a top surface, being a light receiving surface, of the photoelectric conversion portion 11 is located below the wiring layer 8. In the organic CMOS sensor, the thickness of the organic photoelectric conversion layer 10 having a photoelectric conversion function is 0.5 μm. In each of the back side illumination CMOS sensor and the front side illumination CMOS sensor, the thickness of the photoelectric conversion portion 11, composed of the silicon photodiode, is the order of 5 μm in the depth direction.

By placing the light receiving surface of the photoelectric conversion portion 11 above the wiring layer 8, the organic CMOS sensor and the back side illumination CMOS sensor have more sensitivity with less loss of incident light rays compared to the front side illumination CMOS sensor. The incident light is prevented from being reflected or blocked by the wiring layer 8 before the light reaches the light receiving surface. Thus, the deterioration in sensitivity to the obliquely incident light is prevented. When the thickness T of the organic photoelectric conversion layer 10 or the photoelectric conversion portion 11 in the depth direction is reduced, the light leak to the photoelectric conversion portion 11 of adjacent pixels is prevented regardless of whether the light is transmitted through the microcolor filter layer 6 vertically or obliquely. As a result, color mixture is prevented. To prevent the color mixture, the back side illumination CMOS sensor shown in FIG. 2B requires the microlens array 16 to refract the obliquely incident light sufficiently so that the light enters the microcolor filter layer 6 as vertically as possible. On the other hand, the organic CMOS sensor shown in FIG. 2A eliminates the need for the microlens array 16.

Figure 3:
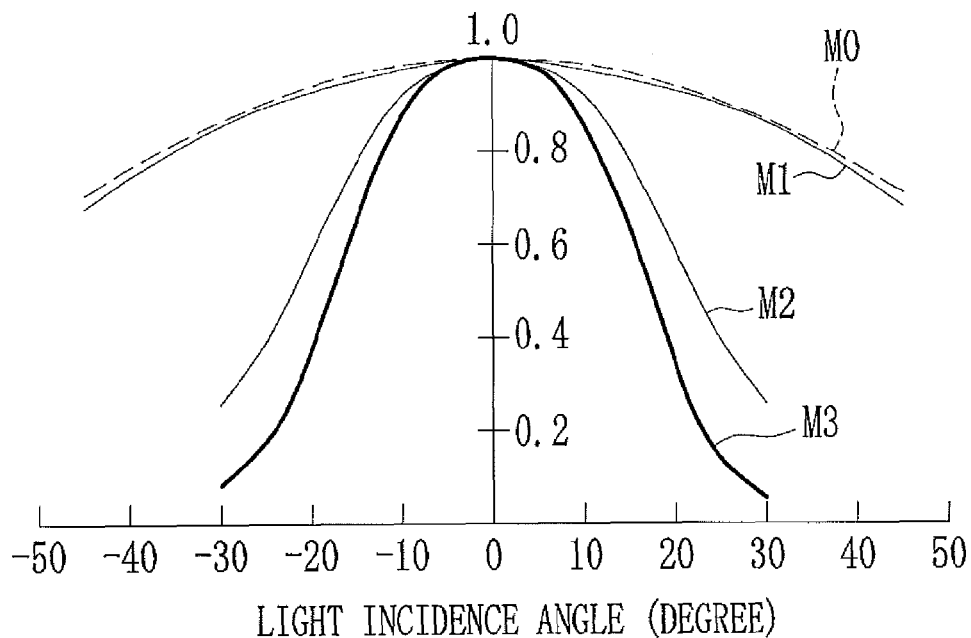
FIG. 3 is a graph showing a correlation between an image height on an image forming plane and an incidence angle.

In the back side illumination and front side illumination CMOS sensors shown in FIGS. 2B and 2C, when light is incident at an angle greater than or equal to 30° relative to the normal to the microcolor filter layer 6, a percentage of light incident on the photoelectric conversion portion 11 of the pixel is drastically reduced even if an appropriate microlens array 16 is used. FIG. 3 shows the drastic reduction in relative sensitivity. An angle of incidence (incidence angle) 0° corresponds to vertical (normal) incidence. "M3" denotes sensitivity property of the front side illumination CMOS sensor. The percentage of incidence at the incidence angles of the order of ±20° drops to the order of 35% compared to that of the normal incident light. The incidence angles of approximately ±30° are the limits of incidence.

"M2" denotes the sensitivity property of the back side illumination CMOS sensor. When the incidence angle is the order of ±20°, the sensitivity (relative sensitivity) to the incident light is reduced to approximately 50% relative to that to the normal incident light. The relative sensitivity to the incident light remains at around 25% even at the incidence angles of ±30°. Thus, the back side illumination CMOS sensor is superior to the front side illumination CMOS sensor. "M1" denotes sensitivity property of the organic CMOS sensor. The organic CMOS sensor shows as high sensitivity property as a cosine curve M0, being a theoretical limitation. Practically, the organic CMOS sensor has sufficient sensitivity at the incidence angles around ±45°. This is because the organic photoelectric conversion layer 10 has small thickness and is placed close to the incident surface.

As described above, the sensitivity property of the organic CMOS sensor is significantly superior to that of the back side illumination CMOS sensor, and overwhelmingly superior to that of the front side illumination CMOS sensor. The organic CMOS sensor exhibits the best sensitivity property among the above three types of the CMOS sensors. To implement the present invention, the relative sensitivity at the incidence angles of ±30° only needs to be greater than or equal to 20% relative to the sensitivity to the normal incident light. The solid state image sensor with the relative sensitivity lower than 20% at the incidence angles of ±30° cannot tolerate deterioration of SN ratio when shading correction is performed in the image processing afterwards. As a result, the image quality is deteriorated significantly. It is preferable to use a solid state image sensor with the relative sensitivity exceeding 50% at the incidence angles of ±30°. Accordingly, the front-side illumination CMOS sensor having the sensitivity property shown in FIG. 2C is not suitable. On the other hand, the back-side illumination CMOS sensor can be used practically.

Figure 4:
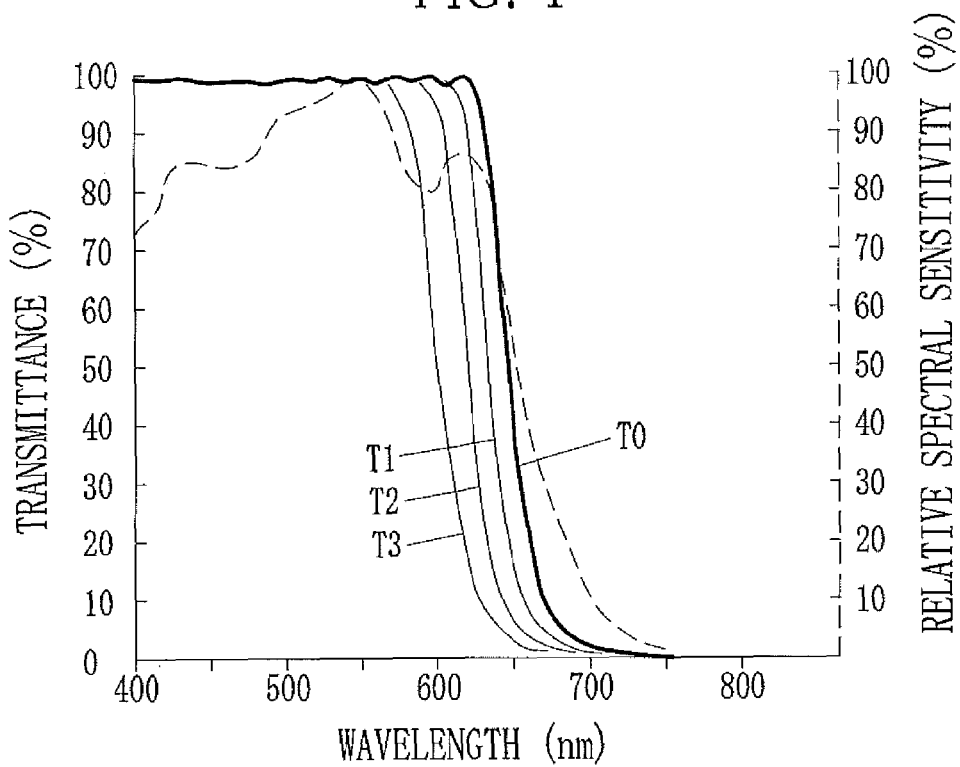
FIG. 4 is a graph showing spectral transmittance of an IR cut filter.

Having sensitivity to an IR region, the front side illumination CMOS sensor generally incorporates an IR cut filter into its image-forming optical system. A common IR cut filter with multi-layers has spectral transmittance represented by "T0" in FIG. 4 by way of example. A half value of the spectral transmittance "T0" of normal incident light is set to the order of 650 nm. However, obliquely incident light causes a wavelength shift. The transmission property varies in accordance with the incidence angle. In FIG. 4, "T1" denotes the transmission property at the incidence angle of 20°. "T2" denotes the transmission property at the incidence angle of 30°. "T3" denotes the transmission property at the incidence angle of 40°. The wavelength shift causes color shading. The color shading is a phenomenon in which a color in an image center area where an incidence angle is small is different from that in a peripheral image area where an incidence angle is large. To prevent the color shading, the front side illumination CMOS sensor requires to limit the maximum incidence angle of the principal ray incident on the image forming plane, especially on its periphery, to be 25° to 30°.

On the other hand, the imaging device of the present invention breaks through the limitation of the conventional designs and increases the maximum incidence angle of the principal ray to greater than or equal to 33° to realize the image-forming optical system with the total length of less than 3.6 mm. By further increasing the maximum incidence angle to greater than or equal to 40°, the total length is reduced to the order of 3.3 mm. More preferably, by increasing the maximum incidence angle to greater than or equal to 45°, the total length is reduced to the order of 3.0 mm. Here, the total length of the image-forming optical system refers to the distance between a forwardmost plane and an image forming plane of the image-forming optical system. It is preferable to improve the solid state image sensor used together with the image-forming optical system so as not to leak the light to adjacent pixels, as described with reference to FIGS. 2 and 3, even if the maximum incidence angle of the principal ray is increased. For this reason, for the imaging device of the present invention, the organic CMOS sensor shown in FIG. 2A and the back side illumination image sensor shown in FIG. 2B are suitable.

Especially, the organic CMOS sensor is capable of reducing the sensitivity significantly in the IR region as indicated by a broken line in the spectral transmittance shown in FIG. 4. Accordingly, it is not necessary to incorporate the IR cut filter into the image-forming optical system in a practical application. Thus, the color shading is eliminated and manufacture cost is cut down by omitting the IR cut filter.

In the image-forming optical system of the present invention, the total length D of the image-forming optical system composed of two or more lenses is less than 3.60 mm, and more preferably 3.50 mm, and the maximum incidence angle of the principal ray on the image forming plane exceeds 33°. Here, the principal ray refers to a light ray that passes through a center of an optical aperture stop plane and reaches the image forming plane. The total length D of the image-forming optical system refers to a distance between the aperture stop plane and the image forming plane when the aperture stop plane is positioned at the forwardmost end of the image-forming optical system. When the image-forming optical system includes a parallel flat plate with no power, the thickness of the parallel flat plate is converted into an equivalent air distance or reduced distance in accordance with its refractive index and thickness, to calculate the total length D.

When the image-forming optical system of the present invention is composed of four lenses, a condition $f/fL<-1.50$ is satisfied where "f" denotes a focal length of the entire image-forming optical system and "fL" denotes the focal length of a last lens, closest to the solid state image sensor, with power. Without satisfying the condition, it is difficult to maintain optical performance, for example, resolution, while the total length D of the image-forming optical system is reduced. Practically, it is preferable to set a lower limit to the condition as follows: $-3.00<f/fL<-1.5$. When the value f/fL is smaller than the lower limit, the negative power of the last lens becomes too strong to maintain the optical performance.

Furthermore, it is effective to satisfy a condition $D/f<1.10$ where "D" denotes the total length of the image-forming optical system and "f" denotes the focal length of the entire image-forming optical system. When the total length D is shortened without satisfying this condition, a camera angle becomes too wide, which is not preferable for optical specification in general use. When a lower limit is set, it is preferable to set the condition as follows: $0.80<D/f<1.10$. When the value D/f is smaller than the lower limit, power of each lens becomes too strong to correct aberration.

When the image-forming optical system of the present invention is composed of three lenses, it is preferable to satisfy a conditional expression $f/fL<-0.90$. The optical performance is deteriorated when the conditional expression is not satisfied. It is more preferable to satisfy a conditional expression with a lower limit, $-2.00<f/fL<-0.90$. When the value f/fL is smaller than the lower limit, the negative power of the last lens becomes too strong to maintain the optical performance. In both of the three-lens configuration and the four-lens configuration, it is preferable that a surface of the last lens on the image-forming plane side is concave, relative to the image-forming plane, around an optical axis. Thereby, it becomes easy to maintain the f/fL at an appropriate value.

Hereinafter, specific embodiments of the present invention are described by way of example. In embodiments 1 to 8, the image-forming optical system is composed of four lenses. In the embodiments 9 to 14, the image-forming optical system is composed of three lenses. Typical numerical data of the embodiments 1 to 14 is shown in table 1. Numerical data of the comparative examples 1 to 6 is also shown in the table 1 for reference. The comparative examples 1 and 2 are embodiments 1 and 2 of the U.S. Patent Application Publication No. 2007/0070525, respectively. The comparative examples 3 and 4 are embodiments 1 and 4 of the U.S. Patent Application Publication No. 2008/0266676, respectively. The comparative examples 5 and 6 are embodiments 4 and 7 of the U.S. Patent Application Publication No. 2008/0180814, respectively. In the above embodiments, the three-lens configuration and the four-lens configuration are described. The present invention is also applicable to a configuration with five or more lenses. In this case, the same numerical range as that of the four-lens configuration can be applied.

TABLE 1

| | (1) | (2) | (3) (mm) | (4) (mm) | CRA (°) | f/fL | D/f | f (mm) | fL (mm) | (5) |
|---|---|---|---|---|---|---|---|---|---|---|
| E1 | 4 | Y | 3.382 | 3.303 | 36.8 | −1.661 | 1.068 | 3.093 | −1.863 | 2.65 |
| E2 | 4 | N | 3.008 | | 45.8 | −1.567 | 1.002 | 3.002 | −1.916 | 2.64 |
| E3 | 4 | N | 3.129 | | 45.5 | −1.603 | 1.04 | 3.008 | −1.877 | 2.64 |
| E4 | 4 | Y | 3.205 | 3.127 | 46.9 | −1.529 | 1.041 | 3.005 | −1.965 | 2.64 |
| E5 | 4 | Y | 3.597 | 3.495 | 36.2 | −1.614 | 1.213 | 2.880 | −1.784 | 2.58 |
| E6 | 4 | N | 3.392 | | 34.9 | −1.595 | 1.256 | 2.701 | −1.694 | 2.39 |
| E7 | 4 | N | 3.322 | | 44.6 | −1.210 | 1.255 | 2.647 | −2.187 | 2.36 |
| E8 | 4 | N | 3.087 | | 38.7 | −2.015 | 1.179 | 2.618 | −1.299 | 2.3 |
| E9 | 3 | N | 3.363 | | 40.6 | −1.054 | 1.079 | 3.115 | −2.955 | 3.21 |
| E10 | 3 | N | 3.256 | | 44.9 | −0.977 | 1.083 | 3.007 | −3.079 | 3.21 |
| E11 | 3 | N | 3.257 | | 43.9 | −1.114 | 1.083 | 3.007 | −2.700 | 3.21 |
| E12 | 3 | N | 3.339 | | 41.6 | −1.011 | 1.105 | 3.021 | −2.989 | 3.21 |
| E13 | 3 | Y | 3.216 | 3.166 | 36.0 | −0.081 | 1.164 | 2.721 | −33.604 | 3.2 |
| E14 | 3 | Y | 3.289 | 3.240 | 40.4 | 0.059 | 1.171 | 2.766 | 47.077 | 3.2 |
| CE1 | 4 | Y | 6.509 | 6.408 | 27 | 0.138 | 1.15 | 5.572 | 40.389 | 2.8 |
| CE2 | 4 | Y | 6.54 | 6.436 | 26 | 0.238 | 1.172 | 5.494 | 23.107 | 2.8 |
| CE3 | 4 | Y | 4.209 | 4.107 | 23 | −1.402 | 1.126 | 3.648 | −2.602 | 2.94 |
| CE4 | 4 | Y | 4.206 | 4.103 | 23 | −1.605 | 1.154 | 3.557 | −2.216 | 2.94 |
| CE5 | 3 | Y | 3.36 | 3.22 | 28 | 0.747 | 1.135 | 2.837 | 3.798 | 2.88 |
| CE6 | 3 | Y | 3.34 | 3.199 | 27 | 0.283 | 1.146 | 2.790 | 9.872 | 2.88 |

"E" is an abbreviation for "embodiment". "CE" is an abbreviation for "comparative example". A column (1) indicates the number of lenses. A column (2) indicates whether a filter is used. "Y" denotes that the filter is used. "N" denotes that the filter is not used. A column (3) indicates an actual total length of the image-forming optical system. A column (4) indicates the total length with the equivalent air distance. The column (5) indicates an f value.

Hereinafter, the embodiments 1 to 14 and the comparative examples 1 to 6 are described with reference to tables showing lens data and aspheric coefficients, drawings showing a basic configuration of the image-forming optical system, graphs showing incidence angle of a principal ray (P) incident on a position of the image height on the image forming plane and incidence angles of rays incident from above (U) and below (L) the principal ray, and aberration diagrams of the respective embodiments. In the drawings showing the basic configuration of the image-forming optical system, lenses are assigned "G1", "G2", "G3", and "G4" in this order from the object side. "S" denotes an aperture stop plane. "P" denotes an image forming plane. The IR cut filter FL is composed of a parallel flat plate and does not contribute to the image forming performance. In the spherical aberration diagrams, "F" denotes property corresponding to an F line with a wavelength of 486 nm. "d" denotes property corresponding to a d line with a wavelength of 588 nm. "C" denotes property corresponding to a C line with a wavelength of 656 nm. In the astigmatism diagrams, "s" denotes sagittal property, and "t" denotes tangential property.

In each embodiment of the present invention, all of the surfaces of the lenses are aspheric. In the lens data, a radius of curvature of each surface refers to a paraxial radius of curvature. In the tables of the aspheric coefficients, each of the aspheric coefficients A(i) and the value K, represented by the following expression, are shown. A letter "E" in the tables represents that the subsequent value is a power index of base 10.

The following expression represents the above aspheric shape.

$$Z(h) = C \cdot h^2 / \{1 + (1 - K \cdot C^2 \cdot h^2)^{1/2}\} + \Sigma A(i) \cdot h^i$$

Each letter in the expression denotes the following.

Z: depth of the aspheric surface (mm)
h: a distance (height) between the optical axis and the lens surface (mm)
K: conic constant
C: paraxial curvature=1/R
R: paraxial radius of curvature
Ai: ith ("i" is an integer greater than or equal to 3) aspheric coefficient The following embodiments describe the image-forming optical system for use in the imaging device of the present invention. For the solid state image sensor for common use in the embodiments, its relative sensitivity needs to be greater than or equal to 20% at the incidence angles of ±30° relative to the normal incidence. To be more specific, the organic CMOS sensor or the back side illumination CMOS sensor is used. The photoelectric conversion portion 11 is not limited to the organic photoelectric conversion layer 10. It is more preferable that the relative sensitivity of the photoelectric conversion portion 11 exceeds 50% at the incidence angles of ±30°.

Embodiment 1

Figure 5:
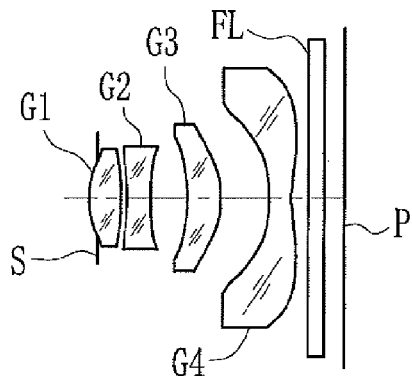
FIG. 5 is a lens configuration of an image-forming optical system according to an embodiment 1 of the present invention.

The image-forming optical system of the embodiment 1 has a configuration shown in FIG. 5. The lens data and the aspheric coefficients are shown in tables 2 and 3, respectively.

Figure 6:
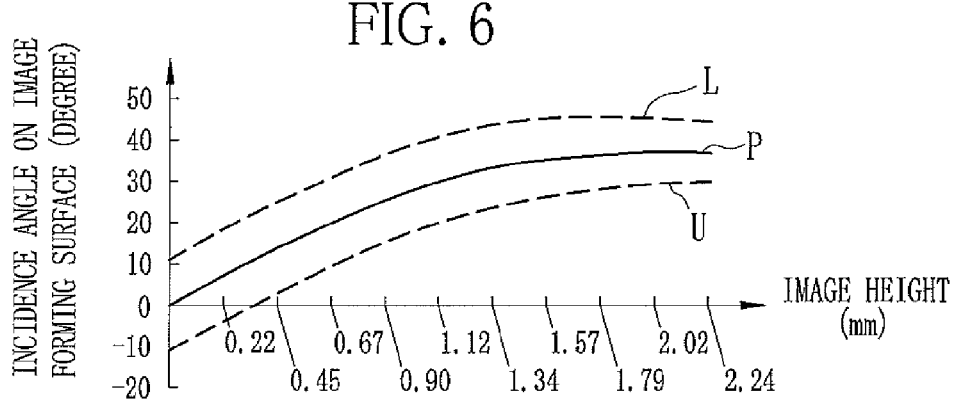
FIG. 6 is a graph showing a relation between an image height on the image forming plane and an incidence angle according to the embodiment 1.
Figure 7A:
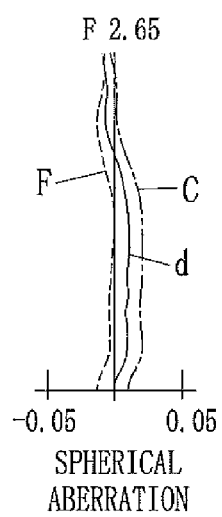
FIG. 7A shows aspheric aberration of the image-forming optical system according to the embodiment 1.
Figure 7B:
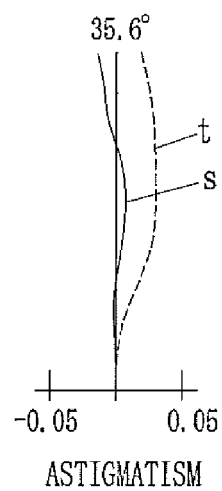
FIG. 7B shows astigmatism of the image-forming optical system according to the embodiment 1.
Figure 7C:
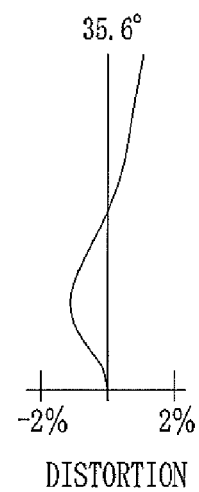
FIG. 7C shows distortion of the image-forming optical system according to the embodiment 1.

FIG. 6 shows the graph representing the relation between the image height on the image forming plane and the incidence angle. FIGS. 7A to 7C are the aberration diagrams: FIG. 7A shows the spherical aberration diagram; FIG. 7B shows the astigmatism diagram; and FIG. 7C shows the distortion diagram.

TABLE 2

| lens surface number | center radius | distance | refractive index | Abbe Number |
|---|---|---|---|---|
| 1 | 0.000 | 0.120 | | |
| aperture stop | 0.000 | −0.120 | | |
| 3 | 1.152 | 0.415 | 1.536228 | 53.84 |
| 4 | −13.063 | 0.080 | | |
| 5 | −3.033 | 0.327 | 1.639891 | 23.63 |
| 6 | −7776.775 | 0.480 | | |
| 7 | −2.511 | 0.450 | 1.536228 | 53.84 |
| 8 | −1.232 | 0.633 | | |
| 9 | −6.468 | 0.300 | 1.536228 | 53.84 |
| 10 | 1.194 | 0.200 | | |
| 11 | 0.000 | 0.230 | 1.518249 | 64.14 |
| 12 | 0.000 | 0.267 | | |
| image forming plane | 0.000 | * | | |

TABLE 3

Aspheric coefficients

| lens surface number | K | A(3) | A(4) |
|---|---|---|---|
| 3 | −5.5174440E+00 | −6.3014927E−02 | 9.4449566E−01 |
| 4 | 0.0000000E+00 | −4.6191443E−02 | 1.7849980E−01 |
| 5 | 0.0000000E+00 | 2.1063587E−02 | 8.9343410E−02 |
| 6 | 0.0000000E+00 | 4.4956708E−03 | 4.6179536E−01 |
| 7 | −1.0000009E+01 | −6.3305135E−02 | 6.1890633E−02 |
| 8 | −9.9664450E−01 | −1.1341495E−01 | 2.7203137E−01 |
| 9 | 1.0000000E+00 | −4.2679854E−01 | 1.6266269E−01 |
| 10 | −2.3720568E+00 | −5.5698891E−01 | 4.3967120E−01 |

| lens surface number | A(5) | A(6) | A(7) |
|---|---|---|---|
| 3 | −1.4331977E+00 | 1.2852829E+00 | −7.4990043E−01 |
| 4 | −3.3300021E−01 | 2.3738649E−01 | −1.0395206E+00 |
| 5 | 4.4378245E−01 | −2.5176008E−01 | −1.5961159E+00 |
| 6 | −4.3677450E−01 | 4.7299708E−01 | 1.2735256E−01 |
| 7 | 2.8149357E−02 | −3.5088281E−01 | 4.7967919E−02 |
| 8 | −4.2951375E−01 | 4.1613400E−01 | −2.6018566E−01 |
| 9 | 1.1038820E−02 | −5.9141012E−02 | −8.5070054E−02 |
| 10 | −1.2026013E−01 | −6.4890159E−02 | 5.5868206E−02 |

| lens surface number | A(8) | A(9) | A(10) |
|---|---|---|---|
| 3 | −1.1885159E+00 | 4.7457335E+00 | −5.2884874E+00 |
| 4 | 7.0133998E−01 | −1.5810265E+00 | 1.5869174E+00 |
| 5 | 3.7050351E−01 | 6.7537457E−01 | 1.6658424E+00 |
| 6 | −8.0225627E−01 | −9.2956816E−02 | 1.2949321E+00 |
| 7 | 4.0704739E−01 | −1.6589558E−01 | −1.7628279E−01 |
| 8 | −8.2484474E−02 | 2.2402986E−01 | −2.7563368E−02 |
| 9 | 9.9051557E−02 | 2.8099261E−02 | −2.5942572E−02 |
| 10 | −3.2334003E−02 | 2.0407702E−02 | −5.6297501E−03 |

In the embodiment 1, the actual total length of the image-forming optical system is 3.382 mm. However, when the thickness of the IR cut filter is converted into its equivalent air distance, the total length D is 3.303 mm. Thus, the total length D satisfies the condition, D<3.6 mm. The maximum incidence angle of the principal ray on the peripheral portion of the image forming plane is approximately 36.8°, and thus satisfying the predetermined condition. The maximum incidence angle of the principal ray on the image forming plane in each of the embodiments and comparative examples is indicated as "CRA" (abbreviation for chief ray angle) in the table 1. As shown in the table 1, the focal length "f" of the entire image-forming optical system is 3.09 mm. The focal length "fL" of the last lens G4 is −1.860 mm. Accordingly, the value "f/fL" is −1.661 (<−1.50). The value "D/f" is 1.068 (<1.10). Thus, the values f/fL and D/f satisfy the predetermined conditions.

Embodiment 2

Figure 8:
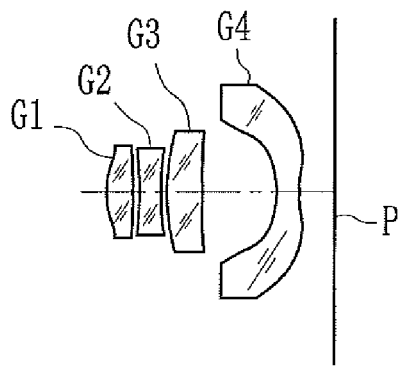
FIG. 8 shows a lens configuration of an image-forming optical system according to an embodiment 2 of the present invention.
Figure 9:
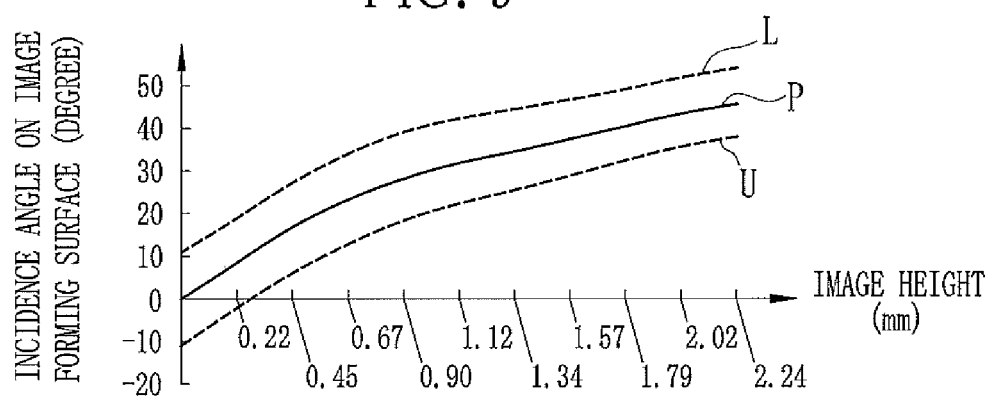
FIG. 9 is a graph showing a relation between an image height on an image forming plane and an incidence angle according to the embodiment 2.
Figure 10A:
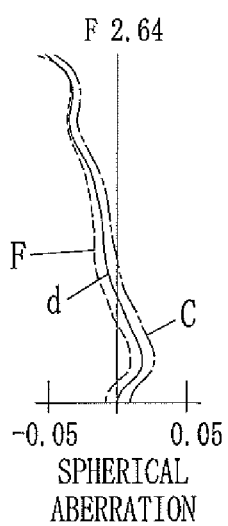
FIG. 10A shows spherical aberration of the image-forming optical system according to the embodiment 2.
Figure 10B:
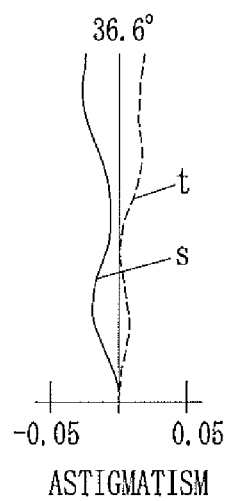
FIG. 10B shows astigmatism of the image-forming optical system according to the embodiment 2.
Figure 10C:
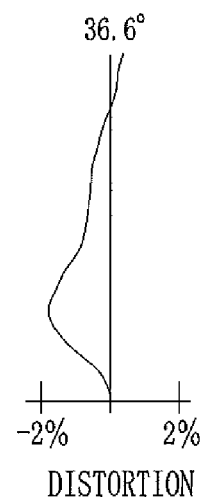
FIG. 10C shows distortion of the image-forming optical system according to the embodiment 2.

The image-forming optical system of the embodiment 2 has the configuration shown in FIG. 8. The lens data and aspheric coefficients are shown in tables 4 and 5, respectively. In this embodiment, it is difficult to depict the aperture stop because the aperture stop substantially coincides with the surface of the first lens G1 on the image-forming plane side, so the illustration of the aperture stop is omitted in FIG. 8. FIG. 9 shows the graph representing the relation between the image height on the image forming plane and the incidence angle. FIGS. 10A to 10C are aberration diagrams: FIG. 10A shows the spherical aberration diagram; FIG. 10B shows the astigmatism diagram; and FIG. 10C shows the distortion diagram.

TABLE 4

| lens surface number | center radius | distance | refractive index | Abbe number |
|---|---|---|---|---|
| 1 | 0.000 | 0.000 | | |
| 2 | 1.018 | 0.336 | 1.536228 | 53.84 |
| 3 | 5.965 | 0.010 | | |
| aperture stop | 0.000 | 0.080 | | |
| 5 | −2.188 | 0.300 | 1.639891 | 23.63 |
| 6 | −69.423 | 0.080 | | |
| 7 | 1.737 | 0.450 | 1.536228 | 53.84 |
| 8 | 46.504 | 0.974 | | |
| 9 | −1.260 | 0.300 | 1.536228 | 53.84 |
| 10 | 5.888 | 0.200 | | |
| 11 | 0.000 | 0.278 | | |
| 12 | | | | |
| image forming plane | 0.000 | * | | |

TABLE 5

Aspheric coefficients

| lens surface number | K | A(3) | A(4) |
|---|---|---|---|
| 2 | −9.2724816E+00 | −1.2738727E−01 | 1.8639758E+00 |
| 3 aperture stop | 0.0000000E+00 | −7.9048807E−02 | 3.5483920E−01 |
| 5 | 0.0000000E+00 | 5.7649121E−02 | −8.7865599E−01 |
| 6 | 0.0000000E+00 | −1.5797904E−02 | −5.1352045E−01 |
| 7 | −1.0000009E+01 | −1.1422975E−01 | 4.4595608E−01 |
| 8 | −3.9171073E+00 | −4.5363370E−02 | −4.4560949E−02 |
| 9 | 1.0000000E+00 | 2.4416641E+00 | −1.2557948E+01 |
| 10 | −6.8678770E+00 | 1.3744549E+00 | −5.4070313E+00 |

TABLE 5-continued

Aspheric coefficients

| lens surface number | A(5) | A(6) | A(7) |
|---|---|---|---|
| 2 | −2.0491175E+00 | −6.3643957E+00 | 1.7666027E+01 |
| 3 aperture stop | −5.0288530E+00 | 1.8689251E+01 | −3.8204750E+01 |
| 5 | 4.9040501E+00 | −1.1430925E+01 | 7.2320134E+00 |
| 6 | 2.0820733E+00 | −2.8434707E+00 | 8.4194806E+00 |
| 7 | −4.2940008E+00 | 1.4417470E+01 | −1.5042410E+01 |
| 8 | 7.4359670E−01 | −2.4741448E+00 | 3.0220403E+00 |
| 9 | 2.7065242E+01 | −3.2291753E+01 | 2.2328068E+01 |
| 10 | 7.3919687E+00 | −4.2480912E+00 | −1.9600168E−02 |

| lens surface stop | A(8) | A(9) | A(10) |
|---|---|---|---|
| 2 | −3.0776734E+00 | −3.7425345E+01 | 3.1097906E+01 |
| 3 aperture stop | 2.8385532E+01 | 1.6427506E+01 | −2.5175458E+01 |
| 5 | 3.8045783E+01 | −9.0152981E+01 | 6.2365363E+01 |
| 6 | −4.6913596E+00 | −1.6371357E+01 | 1.7503857E+01 |
| 7 | −7.2167769E+00 | 2.4602204E+01 | −1.3482195E+01 |
| 8 | −1.6301019E−01 | −1.0781050E+00 | 2.1930205E−02 |
| 9 | −1.2357241E+01 | 6.7483387E+00 | −1.7751829E+00 |
| 10 | 7.5477518E−01 | 4.8460586E−02 | −1.1886476E−01 |

In the embodiment 2, the actual total length of the image-forming optical system is 3.008 mm. Since there is no IR cut filter in the image-forming optical system, the actual total length (the total length D) satisfies the condition D<3.6 mm. The maximum incidence angle of the principal ray in the peripheral portion of the image forming plane is approximately 45.8° (>33°), and thus satisfying the predetermined condition. As shown in the table 1, the focal length f of the entire image-forming optical system is 3.00 mm. The focal length fL of the last lens G4 is −1.914 mm. The value f/fL is −1.567 (<−1.50). The value D/f is 1.002 (<1.10). Thus, the values f/fL and D/f satisfy the predetermined conditions.

Embodiment 3

Figure 11:
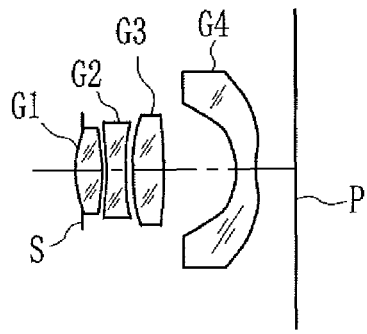
FIG. 11 shows a lens configuration of an image-forming optical system according to an embodiment 3 of the present invention.
Figure 12:
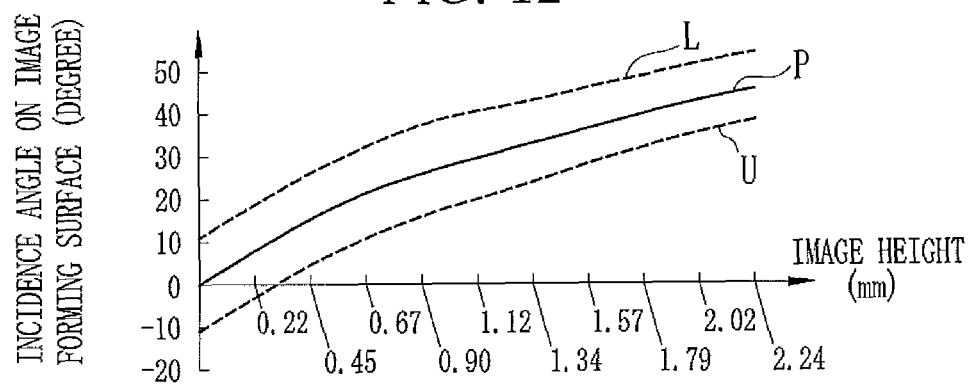
FIG. 12 is a graph showing a relation between an image height on an image forming plane and an incidence angle according to the embodiment 3.
Figure 13A:
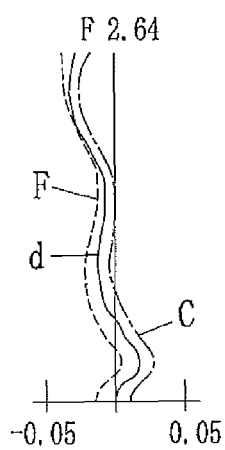
FIG. 13A shows spherical aberration of an image-forming optical system according to the embodiment 3.
Figure 13B:
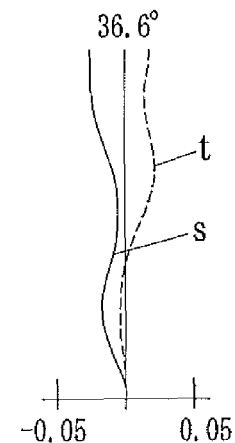
FIG. 13B shows astigmatism of the image-forming optical system according to the embodiment 3.
Figure 13C:
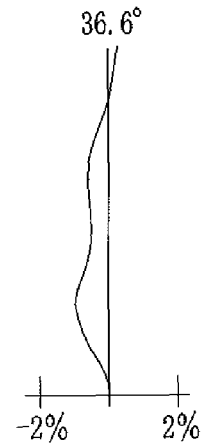
FIG. 13C shows distortion of the image-forming optical system according to the embodiment 3.

The image-forming optical system of the embodiment 3 has the configuration shown in FIG. 11. The lens data and aspheric coefficients are shown in Tables 6 and 7, respectively. FIG. 12 shows the graph representing the relation between the image height on the image forming plane and the incidence angle. FIGS. 13A to 13C are aberration diagrams: FIG. 13A shows the spherical aberration diagram; FIG. 13B shows the astigmatism diagram; and FIG. 13C shows the distortion diagram.

TABLE 6

| lens surface number | center radius | distance | refractive index | Abbe Number |
|---|---|---|---|---|
| 1 | 0.000 | 0.100 | | |
| aperture stop | 0.000 | −0.100 | | |
| 3 | 1.122 | 0.358 | 1.536228 | 53.84 |
| 4 | 29.037 | 0.080 | | |
| 5 | −1.282 | 0.300 | 1.639891 | 23.63 |
| 6 | −2.468 | 0.080 | | |
| 7 | 3.303 | 0.450 | 1.536228 | 53.84 |
| 8 | −6.040 | 1.004 | | |
| 9 | −1.730 | 0.300 | 1.536228 | 53.84 |

TABLE 6-continued

| lens surface number | center radius | distance | refractive index | Abbe Number |
|---|---|---|---|---|
| 10 | 2.524 | 0.200 | | |
| 11 | 0.000 | 0.357 | | |
| 12 image forming plane | 0.000 | * | | |

TABLE 7

Aspheric coefficients

| lens surface number | K | A(3) | A(4) |
|---|---|---|---|
| 3 | −5.8251168E+00 | −1.4948920E−01 | 1.6830158E+00 |
| 4 | 0.0000000E+00 | −1.2897269E−01 | 9.1595373E−01 |
| 5 | 0.0000000E+00 | 3.0632027E−04 | 6.7906827E−01 |
| 6 | 0.0000000E+00 | −1.2071988E−01 | 1.6694891E+00 |
| 7 | −1.0000009E+01 | −1.6956326E−01 | 1.3130779E+00 |
| 8 | 9.6746117E+00 | −1.4561565E−02 | −5.7591900E−02 |
| 9 | 1.0000000E+00 | 5.6321635E−01 | −3.3085940E+00 |
| 10 | −9.9999996E+00 | 1.3748001E−01 | −1.2478992E+00 |

| lens surface number | A(5) | A(6) | A(7) |
|---|---|---|---|
| 3 | −3.9835080E+00 | 2.1180103E+00 | 6.0512501E+00 |
| 4 | −5.1197681E+00 | 1.1771381E+01 | −1.3998553E+01 |
| 5 | 5.8990036E−01 | −3.3402935E+00 | 3.1466479E+00 |
| 6 | −2.1712088E+00 | −4.1057908E−02 | 6.1149645E+00 |
| 7 | −3.9242623E+00 | 5.1528121E+00 | −1.5958174E+00 |
| 8 | −1.7545563E−01 | −4.1444629E−02 | 8.1493181E−01 |
| 9 | 4.3763369E+00 | −2.4558146E+00 | −8.6899727E−01 |
| 10 | 1.2256274E+00 | −4.6142447E−01 | −8.1108082E−03 |

| lens surface number | A(8) | A(9) | A(10) |
|---|---|---|---|
| 3 | −6.7456740E+00 | −1.0696916E+01 | 1.0629136E+01 |
| 4 | 4.8060870E+00 | 2.6665950E+00 | −2.0469411E+00 |
| 5 | 1.4477557E+01 | −3.6139358E+01 | 2.3302587E+01 |
| 6 | −2.6344287E+00 | −8.6875854E+00 | 6.5689483E+00 |
| 7 | −1.9787621E+00 | 1.6301664E+00 | −2.6341821E−01 |
| 8 | −6.4869533E−01 | −4.1678833E−01 | 7.8863187E−01 |
| 9 | 3.6224700E−01 | 1.4794709E+00 | −7.3157925E−01 |
| 10 | 2.5612777E−02 | 5.4715841E−02 | −2.8539137E−02 |

In the embodiment 3, the actual total length of the image-forming optical system is 3.129 mm. Since there is no IR cut filter in the image-forming optical system, the actual total length (the total length D) satisfies the condition. The maximum incidence angle of the principal ray in the peripheral portion of the image forming plane is approximately 45.5° (>33°). As shown in the table 1, the focal length f of the entire image-forming optical system is 3.01 mm. The focal length fL of the last lens G4 is −1.878 mm. The value f/fL is −1.603 (<−1.50). The value D/f is 1.040 (<1.10). Thus, the values f/fL and D/f satisfy the predetermined conditions.

Embodiment 4

Figure 14:
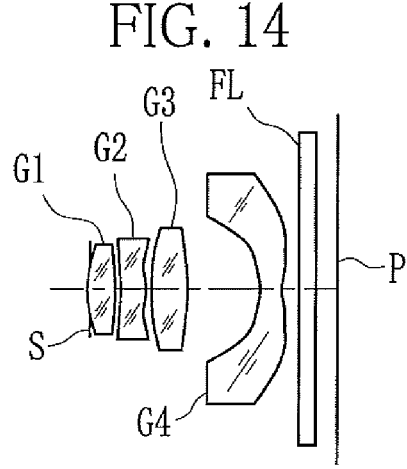
FIG. 14 shows a lens configuration of an image-forming optical system according to an embodiment 4 of the present invention.
Figure 15:
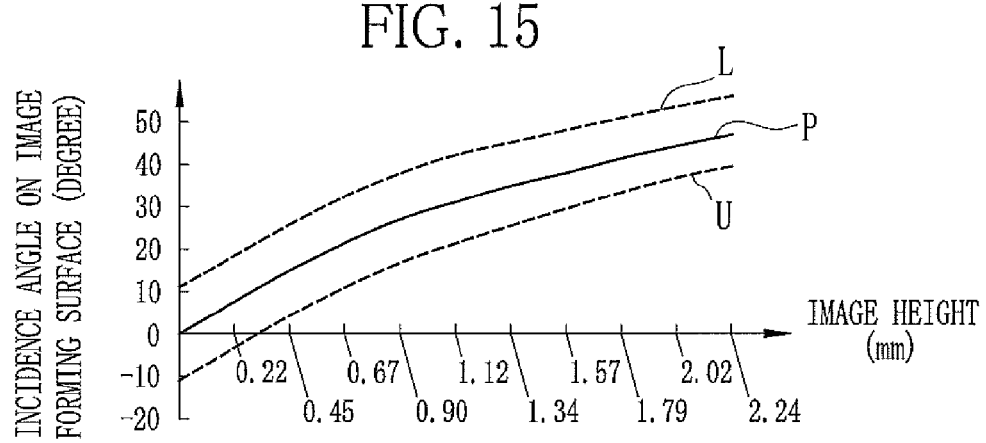
FIG. 15 is a graph showing a relation between an image height on an image-forming plane and an incidence angle according to the embodiment 4.
Figure 16A:
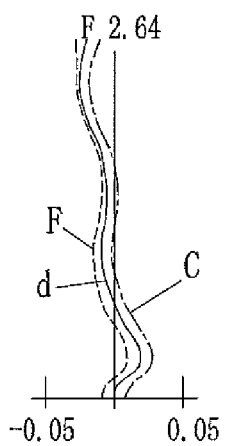
FIG. 16A shows spherical aberration of the image-forming optical system according to the embodiment 4.
Figure 16B:
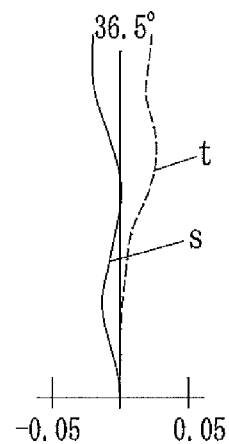
FIG. 16B shows astigmatism of the image-forming optical system according to the embodiment 4.
Figure 16C:
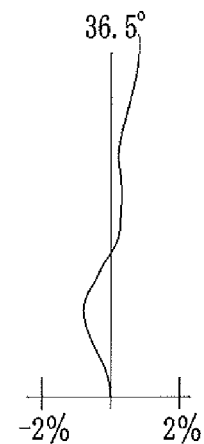
FIG. 16C shows distortion of the image-forming optical system according to the embodiment 4.

The image-forming optical system of the embodiment 4 has the configuration shown in FIG. 14. The lens data and aspheric coefficients are shown in Tables 8 and 9, respectively. FIG. 15 shows the graph representing the relation between the image height on the image forming plane and the incidence angle. FIGS. 16A to 16C are aberration diagrams: FIG. 16A shows the spherical aberration diagram; FIG. 16B shows the astigmatism diagram; and FIG. 16C shows the distortion diagram.

TABLE 8

| lens surface number | center radius | distance | refractive index | Abbe number |
|---|---|---|---|---|
| 1 | 0.000 | 0.100 | | |
| aperture stop | 0.000 | −0.100 | | |
| 3 | 1.136 | 0.365 | 1.536228 | 53.84 |
| 4 | −172.130 | 0.080 | | |
| 5 | −1.351 | 0.300 | 1.639891 | 23.63 |
| 6 | −3.235 | 0.080 | | |
| 7 | 2.849 | 0.450 | 1.536228 | 53.84 |
| 8 | −6.367 | 0.929 | | |
| 9 | −3.033 | 0.300 | 1.536228 | 53.84 |
| 10 | 1.660 | 0.200 | | |
| 11 | 0.000 | 0.230 | 1.51633 | 64.14 |
| 12 | 0.000 | 0.272 | | |
| image forming plane | 0.000 | * | | |

TABLE 9

Aspheric coefficients

| lens surface number | K | A(3) | A(4) |
|---|---|---|---|
| 3 | −6.1413825E+00 | −1.3503046E−01 | 1.5761374E+00 |
| 4 | 0.0000000E+00 | −1.1743467E−01 | 9.1620320E−01 |
| 5 | 0.0000000E+00 | 5.8780175E−03 | 6.3943490E−01 |
| 6 | 0.0000000E+00 | −1.2545631E−01 | 1.5167715E+00 |
| 7 | −1.0000009E+01 | −1.8170104E−01 | 1.1866757E+00 |
| 8 | 6.3387936E+00 | −7.0760685E−03 | −1.2015574E−01 |
| 9 | 1.0000000E+00 | 3.9025041E−01 | −2.7899010E+00 |
| 10 | −1.0000000E+01 | 2.9580196E−02 | −8.7580076E−01 |

| lens surface number | A(5) | A(6) | A(7) |
|---|---|---|---|
| 3 | −3.5506684E+00 | 1.7536923E+00 | 5.1380606E+00 |
| 4 | −4.9679638E+00 | 1.1716660E+01 | −1.3919687E+01 |
| 5 | 6.8345975E−01 | −3.3923984E+00 | 2.8135266E+00 |
| 6 | −2.0973257E+00 | 1.2364342E−01 | 5.9556622E+00 |
| 7 | −3.7487709E+00 | 5.1241161E+00 | −1.5232730E+00 |
| 8 | −4.0846597E−02 | −1.2665135E−01 | 6.5411669E−01 |
| 9 | 3.5196561E+00 | −1.8316614E+00 | −8.9288531E−01 |
| 10 | 9.3075821E−01 | −3.9589102E−01 | 1.2287868E−02 |

| lens surface number | A(8) | A(9) | A(10) |
|---|---|---|---|
| 3 | −5.7846922E+00 | −7.7399666E+00 | 7.2486900E+00 |
| 4 | 4.0816701E+00 | 1.8004068E+00 | 1.6935799E−01 |
| 5 | 1.4167893E+01 | −3.5705608E+01 | 2.3930657E+01 |
| 6 | −2.8125153E+00 | −8.5109313E+00 | 6.7170088E+00 |
| 7 | −2.0123310E+00 | 1.4432547E+00 | −1.3142869E−01 |
| 8 | −4.9701078E−01 | −1.6688994E−01 | 5.5154123E−01 |
| 9 | 2.4315582E−01 | 1.3641001E+00 | −6.4213737E−01 |
| 10 | 1.5629179E−02 | 4.5319703E−02 | −2.2600383E−02 |

In the embodiment 4, the actual total length of the image-forming optical system is 3.205 mm. The image-forming optical system includes the IR cut filter FL. When the thickness of the IR cut filter is converted into its equivalent air distance, the total length D is 3.127 mm, thus satisfying the condition D<3.6 mm. The maximum incidence angle of the principal ray in the peripheral portion of the image forming plane is approximately 46.9° (>33°). As shown in the table 1, the focal length f of the entire image-forming optical system is 3.01 mm. The focal length fL of the last lens G4 is −1.969 mm. The value f/fL is −1.529 (<−1.50). The value D/f is 1.041 (<1.10). Thus, the values f/fL and D/f satisfy the predetermined conditions.

Embodiment 5

Figure 17:
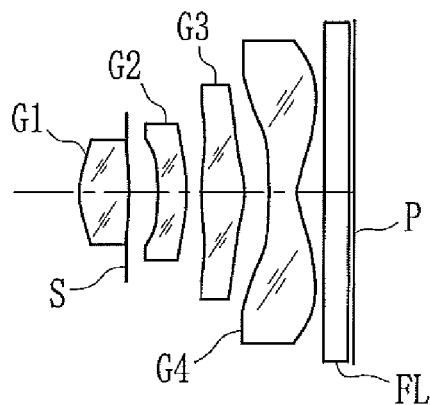
FIG. 17 shows a lens configuration of an image-forming optical system according to an embodiment 5 of the present invention.
Figure 18:
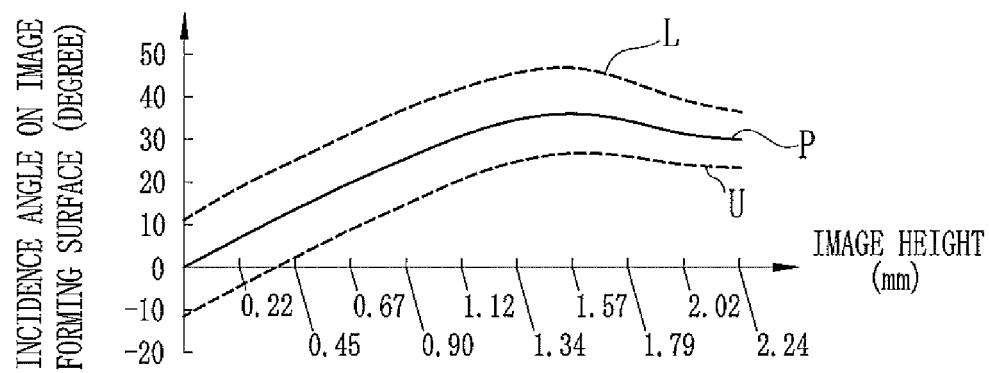
FIG. 18 is a graph showing a relation between an image height on an image forming plane and an incidence angle according to the embodiment 5.
Figure 19A:
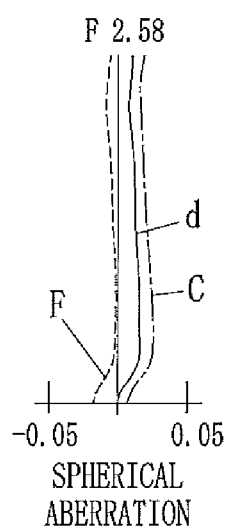
FIG. 19A shows spherical aberration of the image-forming optical system according to the embodiment 5.
Figure 19B:
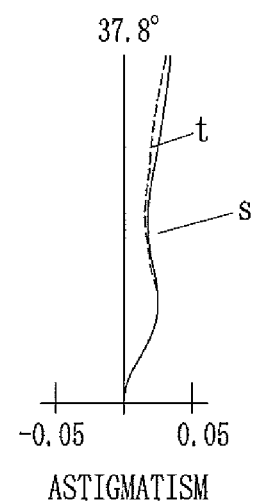
FIG. 19B shows astigmatism of the image-forming optical system according to the embodiment 5.
Figure 19C:
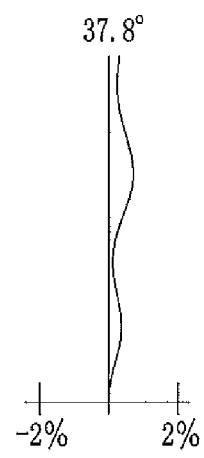
FIG. 19C shows distortion of the image-forming optical system according to the embodiment 5.

The image-forming optical system of the embodiment 5 has the configuration shown in FIG. 17. The lens data and aspheric coefficients are shown in Tables 10 and 11, respectively. FIG. 18 shows the graph representing the relation between the image height on the image forming plane and the incidence angle. FIGS. 19A to 19C are aberration diagrams: FIG. 19A shows the spherical aberration diagram; FIG. 19B shows the astigmatism diagram; and FIG. 19C shows the distortion diagram.

TABLE 10

| lens surface number | center radius | distance | refractive index | Abbe number |
|---|---|---|---|---|
| 1 | 0.000 | 0.000 | | |
| aperture stop | 0.000 | −0.108 | | |
| 3 | 1.322 | 0.635 | 1.533892 | 55.98 |
| 4 | 7.488 | 0.400 | | |
| 5 | −4.956 | 0.350 | 1.633463 | 23.44 |
| 6 | 9.419 | 0.210 | | |
| 7 | 4.020 | 0.568 | 1.533892 | 55.98 |
| 8 | −1.493 | 0.324 | | |
| 9 | 14.559 | 0.380 | 1.533892 | 55.98 |
| 10 | 0.886 | 0.350 | | |
| 11 | 0.000 | 0.300 | 1.518720 | 64.20 |
| 12 | 0.000 | 0.080 | | |
| image forming plane | 0.000 | * | | |

TABLE 11

Aspheric coefficients

| lens surface number | K | A(3) | A(4) |
|---|---|---|---|
| 3 | −8.0528721E+00 | −1.2338742E−02 | 5.6782239E−01 |
| 4 | 4.0896744E+00 | −1.3940438E−02 | −8.9543092E−02 |
| 5 | −1.5688827E+01 | −3.4526961E−02 | −2.7293518E−01 |
| 6 | −2.1825290E+01 | 9.0367483E−02 | −7.3946263E−01 |
| 7 | 2.3392028E+00 | 1.2128543E−01 | −2.8415632E−01 |
| 8 | −3.8930828E+00 | 2.8872076E−02 | 2.6195944E−01 |
| 9 | −1.1057265E+01 | −1.3522480E−01 | −1.5733941E−01 |
| 10 | −4.8821333E+00 | −9.2354847E−02 | −2.8494986E−02 |

| lens surface number | A(5) | A(6) | A(7) |
|---|---|---|---|
| 3 | −3.7502224E−01 | −3.0280973E−01 | −2.4267178E−01 |
| 4 | −5.1821135E−02 | −2.0118481E−02 | 8.0806485E−02 |
| 5 | −1.0419639E+00 | 1.9132663E+00 | 2.4194059E−01 |
| 6 | −4.9630640E−03 | 9.8598525E−01 | −9.2510050E−02 |
| 7 | 6.3320003E−02 | 6.8794504E−02 | −7.9511834E−03 |
| 8 | −2.6862966E−01 | 6.2040482E−02 | 9.7579962E−02 |
| 9 | −1.1535276E−02 | 1.7698565E−01 | −1.0526541E−02 |
| 10 | −2.3370426E−02 | 7.0818547E−02 | −8.5988154E−03 |

| lens surface number | A(8) | A(9) | A(10) |
|---|---|---|---|
| 3 | 1.4865684E+00 | −2.4475783E−01 | −2.4827063E+00 |
| 4 | −9.3418420E−01 | 5.3746593E−01 | 8.7114331E−01 |
| 5 | −3.6950646E+00 | −1.9226422E−01 | 5.4400248E+00 |

TABLE 11-continued

Aspheric coefficients

| | | | |
|---|---|---|---|
| 6 | −1.4264833E+00 | −3.3298737E−02 | 1.9520502E+00 |
| 7 | −1.7142495E−01 | 2.2707946E−01 | −1.0717888E−01 |
| 8 | −5.5737719E−02 | −4.0056274E−02 | 1.9386598E−02 |
| 9 | −6.3806001E−02 | 2.4278464E−04 | 1.8343054E−02 |
| 10 | −2.0176358E−02 | 5.3921939E−04 | 1.7419912E−03 |

| lens surface number | A(11) | A(12) | A(13) |
|---|---|---|---|
| 3 | 1.7567785E+00 | 2.9943398E−01 | 0.0000000E+00 |
| 4 | −3.8305111E−01 | −2.1131147E+00 | 0.0000000E+00 |
| 5 | −1.1123322E−01 | −5.6755133E+00 | 0.0000000E+00 |
| 6 | 6.9864313E−02 | −1.4069790E+00 | 0.0000000E+00 |
| 7 | 6.6981361E−03 | 3.0803801E−03 | 0.0000000E+00 |
| 8 | 5.4281796E−03 | 3.0528557E−03 | 0.0000000E+00 |
| 9 | 4.3602051E−04 | −3.0930701E−03 | −4.5102650E−05 |
| 10 | 2.0047037E−04 | 6.9953237E−04 | 2.9454562E−06 |

| lens surface number | A(14) | A(15) | A(16) |
|---|---|---|---|
| 3 | −1.3705198E+00 | 0.0000000E+00 | 5.5355197E−01 |
| 4 | 1.8335770E+00 | 0.0000000E+00 | −5.1534819E−01 |
| 5 | 3.8815535E+00 | 0.0000000E+00 | −1.5524709E+00 |
| 6 | 7.1242487E−01 | 0.0000000E+00 | −1.9401883E−01 |
| 7 | 5.7650225E−03 | 0.0000000E+00 | −3.3255713E−03 |
| 8 | −2.4707841E−03 | 0.0000000E+00 | 2.7925553E−04 |
| 9 | 1.2891564E−04 | 0.0000000E+00 | 1.6832092E−05 |
| 10 | −2.4623017E−04 | 0.0000000E+00 | 2.3283048E−05 |

In the embodiment 5, the actual total length of the image-forming optical system is 3.597 mm. The image-forming optical system includes the IR cut filter. When the thickness of the IR cut filter is converted into its equivalent air distance, the total length D is 3.495 mm, which is smaller than 3.6 mm. The maximum incidence angle of the principal ray in the peripheral portion of the image forming plane is approximately 36.2° (>33°). As shown in the table 1, the focal length f of the entire image-forming optical system is 2.88 mm. The focal length fL of the last lens G4 is −1.784 mm. The value f/fL is −1.614 (<−1.50), satisfying the predetermined condition. The value D/f is 1.213 and does not satisfy the condition D/f<1.10. However, the imaging performance is excellent and at a sufficiently practical level as shown in aberration diagrams.

Embodiment 6

Figure 20:
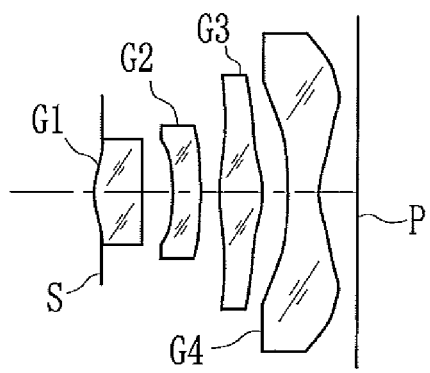
FIG. 20 shows a lens configuration of an image-forming optical system according to the embodiment 6 of the present invention.
Figure 21:
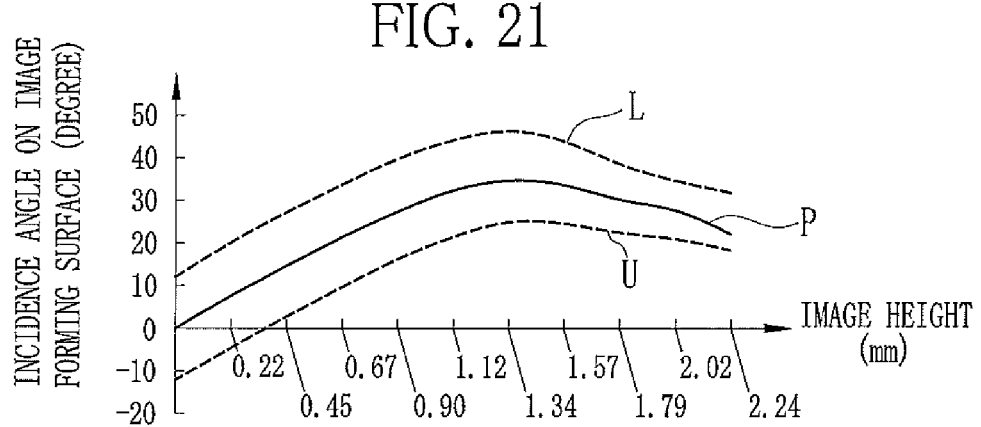
FIG. 21 is a graph showing a relation between an image height on an image forming plane and an incidence angle according to the embodiment 6.
Figure 22A:
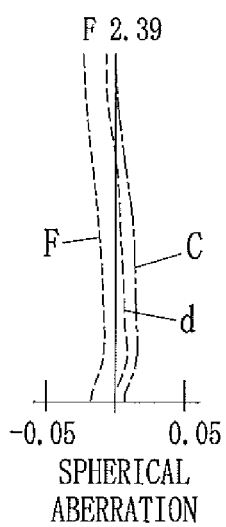
FIG. 22A shows spherical aberration of the image-forming optical system according to the embodiment 6.
Figure 22B:
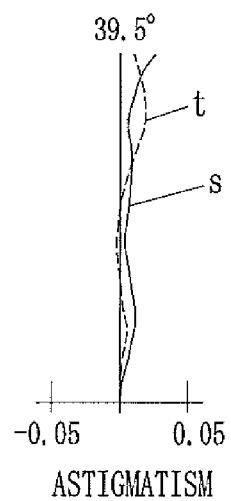
FIG. 22B shows astigmatism of the image-forming optical system according to the embodiment 6.
Figure 22C:
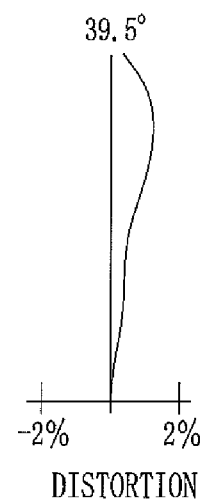
FIG. 22C shows distortion of the image-forming optical system according to the embodiment 6.

The image-forming optical system of the embodiment 6 has the configuration shown in FIG. 20. The lens data and aspheric coefficients are shown in tables 12 and 13, respectively. FIG. 21 shows the graph representing the relation between the image height on the image forming plane and the incidence angle. FIGS. 22A to 22C are aberration diagrams: FIG. 22A shows the spherical aberration diagram; FIG. 22B shows the astigmatism diagram; and FIG. 22C shows the distortion diagram.

TABLE 12

| lens surface number | center radius | distance | refractive index | Abbe number |
|---|---|---|---|---|
| 1 | 0.000 | 0.000 | | |
| aperture stop | 0.000 | −0.108 | | |
| 3 | 1.311 | 0.620 | 1.533892 | 55.98 |
| 4 | 7.854 | 0.401 | | |

TABLE 12-continued

| lens surface number | center radius | distance | refractive index | Abbe number |
|---|---|---|---|---|
| 5 | −5.669 | 0.355 | 1.633463 | 23.44 |
| 6 | 8.230 | 0.222 | | |
| 7 | 3.500 | 0.563 | 1.533892 | 55.98 |
| 8 | −1.514 | 0.331 | | |
| 9 | 27.550 | 0.393 | 1.533892 | 55.98 |
| 10 | 0.871 | 0.508 | | |
| image forming plane | 0.000 | * | | |

TABLE 13

Aspheric coefficients

| lens surface number | K | A(3) | A(4) |
|---|---|---|---|
| 3 | −8.1603946E+00 | −1.1694999E−02 | 5.6896742E−01 |
| 4 | 4.0920418E+00 | −1.3022885E−02 | −9.1477669E−02 |
| 5 | −1.5688400E+01 | −8.8566384E−03 | −2.9158874E−01 |
| 6 | −7.6205498E−01 | 9.9575501E−02 | −7.3660248E−01 |
| 7 | 2.3393591E+00 | 1.1562715E−01 | −2.8403461E−01 |
| 8 | −3.8928334E+00 | 2.3377802E−01 | 2.6438606E−01 |
| 9 | −1.1056798E+01 | −1.2722516E−01 | −1.5535310E−01 |
| 10 | −4.7046216E+00 | −8.0109382E−02 | −3.0834281E−02 |

| lens surface number | A(5) | A(6) | A(7) |
|---|---|---|---|
| 3 | −3.7468430E−01 | −3.0454624E−01 | −2.4943328E−01 |
| 4 | −5.6149675E−02 | −4.1094439E−02 | 5.7777540E−02 |
| 5 | −1.0505265E+00 | 1.9155660E+00 | 2.5212638E−01 |
| 6 | −7.8785101E−03 | 9.8284981E−01 | −9.3521328E−02 |
| 7 | 6.7245531E−02 | 7.1095838E−02 | −6.3208286E−03 |
| 8 | −2.6603805E−01 | 6.3649841E−02 | 9.8190394E−02 |
| 9 | −1.1098957E−02 | 1.7644727E−01 | −1.0506658E−02 |
| 10 | −2.6466675E−02 | 6.9497366E−02 | −8.7954097E−03 |

| lens surface number | A(8) | A(9) | A(10) |
|---|---|---|---|
| 3 | 1.4702127E+00 | −2.7611724E−01 | −2.4827063E+00 |
| 4 | −9.4648257E−01 | 5.4871420E−01 | 9.1339186E−01 |
| 5 | −3.7072786E+00 | −2.1060902E−01 | 5.4400248E+00 |
| 6 | −1.4240651E+00 | −2.5861941E−01 | 1.9519271E+00 |
| 7 | −1.6999207E−01 | 2.2783160E−01 | −1.0732414E−01 |
| 8 | −5.5726696E−02 | −4.0232108E−02 | 1.9259687E−02 |
| 9 | −6.3804388E−02 | 2.4019079E−04 | 1.8340038E−02 |
| 10 | −2.0138791E−02 | 6.0082690E−04 | 1.7861753E−03 |

| lens surface number | A(11) | A(12) | A(13) |
|---|---|---|---|
| 3 | 1.7567785E+00 | 2.9943398E−01 | 0.0000000E+00 |
| 4 | −3.8305111E−01 | −2.1131147E+00 | 0.0000000E+00 |
| 5 | −1.1123322E−01 | −5.6755133E+00 | 0.0000000E+00 |
| 6 | 6.9864313E−02 | −1.4069790E+00 | 0.0000000E+00 |
| 7 | 6.6612657E−03 | 3.0990097E−03 | 0.0000000E+00 |
| 8 | 5.2899585E−03 | 3.0432728E−03 | 0.0000000E+00 |
| 9 | 4.3511741E−04 | −3.0906555E−03 | −4.4748489E−05 |
| 10 | 2.1195039E−04 | 6.9941739E−04 | 3.0355109E−06 |

| lens surface number | A(14) | A(15) | A(16) |
|---|---|---|---|
| 3 | −1.3705198E+00 | 0.0000000E+00 | 5.5355197E−01 |
| 4 | 1.8335770E+00 | 0.0000000E+00 | −5.1534819E−01 |
| 5 | 3.8815535E+00 | 0.0000000E+00 | −1.5524709E+00 |

TABLE 13-continued

| | Aspheric coefficients | | |
|---|---|---|---|
| 6 | 7.1242487E−01 | 0.0000000E+00 | −1.9401883E−01 |
| 7 | 5.7650225E−03 | 0.0000000E+00 | −3.3255713E−03 |
| 8 | −2.4707841E−03 | 0.0000000E+00 | 2.7925553E−04 |
| 9 | 1.2891564E−04 | 0.0000000E+00 | 1.6832092E−05 |
| 10 | −2.4623017E−04 | 0.0000000E+00 | 2.3283048E−05 |

In the embodiment 6, the actual total length of the image-forming optical system is 3.392 mm. Since there is no IR cut filter in the image-forming optical system, the actual total length satisfies the condition D<3.6 mm. The maximum incidence angle of the principal ray in the peripheral portion of the image forming plane is approximately 34.9° (>33°). As shown in the table 1, the focal length f of the entire image-forming optical system is 2.70 mm. The focal length fL of the last lens G4 is −1.693 mm. The value f/fL is −1.595 (<−1.50), satisfying the predetermined condition. The value D/f is 1.256 and does not satisfy the condition D/f<1.10. However, the image forming performance is excellent and is at a sufficiently practical level as shown in aberration diagrams.

Embodiment 7

The image-forming optical system of the embodiment 7 has the configuration shown in FIG. 23. The lens data and aspheric coefficients are shown in Tables 14 and 15, respectively. FIG. 24 shows the graph representing the relation between the image height on the image forming plane and the incidence angle. FIGS. 25A to 25C are aberration diagrams: FIG. 25A shows the spherical aberration diagram; FIG. 25B shows the astigmatism diagram; and FIG. 25C shows the distortion diagram.

TABLE 14

| lens surface number | center radius | distance | refractive index | Abbe number |
|---|---|---|---|---|
| 1 | 0.000 | 0.000 | | |
| aperture stop | 0.000 | −0.108 | | |
| 3 | 1.476 | 0.620 | 1.533892 | 55.98 |
| 4 | 8.052 | 0.400 | | |
| 5 | 7.470 | 0.351 | 1.633463 | 23.44 |
| 6 | 7.051 | 0.255 | | |
| 7 | 4.271 | 0.510 | 1.533892 | 55.98 |
| 8 | −3.858 | 0.350 | | |
| 9 | 3.504 | 0.380 | 1.533892 | 55.98 |
| 10 | 0.843 | 0.456 | | |
| image forming plane | 0.000 | * | | |

TABLE 15

| | Aspheric coefficients | | |
|---|---|---|---|
| lens surface number | K | A(3) | A(4) |
| 3 | −8.2856134E+00 | −5.5853104E−02 | 5.4822704E−01 |
| 4 | 8.7702124E+00 | −2.7454419E−02 | −9.9296948E−02 |
| 5 | −1.3718628E+01 | 5.6783412E−02 | −2.7718524E−01 |
| 6 | −2.7576549E+00 | 1.4569583E−01 | −6.8742903E−01 |
| 7 | 5.2760521E−01 | 2.1006921E−01 | −4.9702535E−01 |
| 8 | −3.5559493E+00 | 7.2337725E−02 | 2.7655364E−01 |
| 9 | 1.0359865E+00 | −9.7897414E−02 | −2.1872276E−01 |
| 10 | −4.4626661E+00 | 2.7707333E−02 | −1.5613596E−01 |

TABLE 15-continued

| | Aspheric coefficients | | |
|---|---|---|---|
| lens surface number | A(5) | A(6) | A(7) |
| 3 | −4.6816001E−01 | −2.6647853E−01 | −1.2674755E−01 |
| 4 | −9.1919408E−02 | −4.7232353E−02 | 8.4475808E−02 |
| 5 | −9.5738293E−01 | 1.9470629E+00 | 2.2941600E−01 |
| 6 | −4.2366175E−02 | 9.7305669E−01 | −8.9954476E−02 |
| 7 | 1.9748522E−01 | 3.2134083E−02 | −2.7410440E−02 |
| 8 | −3.4892422E−01 | 6.9784557E−02 | 1.1926068E−01 |
| 9 | −2.5470828E−02 | 1.8751950E−01 | −1.2616736E−02 |
| 10 | −2.8170487E−04 | 9.3974190E−02 | −7.6624708E−03 |
| lens surface number | A(8) | A(9) | A(10) |
| 3 | 1.4970918E+00 | −5.8897772E−01 | −2.4827063E+00 |
| 4 | −9.1639038E−01 | 5.7295180E−01 | 9.3721561E−01 |
| 5 | −3.7318661E+00 | −2.3222501E−01 | 5.4436951E+00 |
| 6 | −1.4303081E+00 | −4.4183625E−02 | 1.9220979E+00 |
| 7 | −1.1298202E−01 | 2.3348291E−01 | −1.2514579E−01 |
| 8 | −4.9486173E−02 | −3.9936559E−02 | 1.4031392E−02 |
| 9 | −6.4198229E−02 | 3.5487160E−04 | 1.8725334E−02 |
| 10 | −2.1641701E−02 | −1.4325683E−03 | 1.1309248E−03 |
| lens surface number | A(11) | A(12) | A(13) |
| 3 | 1.7567785E+00 | 2.9943378E−01 | −5.0148823E−12 |
| 4 | −3.8305111E−01 | −2.1131148E+00 | −1.5716508E−25 |
| 5 | −1.1107211E−01 | −5.6755063E+00 | 0.0000000E+00 |
| 6 | 4.5621112E−02 | −1.4069727E+00 | 0.0000000E+00 |
| 7 | 6.2275214E−03 | 3.4762304E−03 | 0.0000000E+00 |
| 8 | 6.3719484E−03 | 3.0937212E−03 | 0.0000000E+00 |
| 9 | 4.6624487E−04 | −3.0883719E−03 | −5.9914603E−05 |
| 10 | 3.9581140E−04 | 8.2903232E−04 | 3.3156231E−06 |
| lens surface number | A(14) | A(15) | A(16) |
| 3 | −1.3705198E+00 | −2.5146412E−28 | 5.5355197E−01 |
| 4 | 1.8335770E+00 | −2.5146412E−28 | −5.1534819E−01 |
| 5 | 3.8815535E+00 | 0.0000000E+00 | −1.5524709E+00 |
| 6 | 7.1242492E−01 | 0.0000000E+00 | −1.9401883E−01 |
| 7 | 5.7650225E−03 | 0.0000000E+00 | −3.3255713E−03 |
| 8 | −2.4707841E−03 | 0.0000000E+00 | 2.7925553E−04 |
| 9 | 1.2891564E−04 | −2.5146412E−28 | 1.6832092E−05 |
| 10 | −2.4623017E−04 | −2.5146412E−28 | 2.3283048E−05 |

In the embodiment 7, the actual total length of the image-forming optical system is 3.392 mm. Since there is no IR cut filter in the image-forming optical system, the total length (actual total length) D is less than 3.6 mm. The maximum incidence angle of the principal ray in the peripheral portion of the image forming plane is approximately 44.6° (>33°). As shown in the table 1, the focal length f of the entire image-forming optical system is 2.65 mm. The focal length fL of the last lens G4 is −2.190 mm. The value f/fL is −1.21 and satisfies the condition f/fL<−0.9. The value D/f is 1.255 and does not satisfy the condition D/f<1.10. However, the image forming performance is at a sufficiently practical level as shown in aberration diagrams.

Embodiment 8

Figure 26:
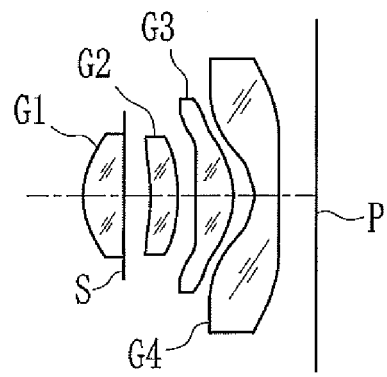
FIG. 26 shows a lens configuration of an image-forming optical system according to an embodiment 8 of the present invention.
Figure 27:
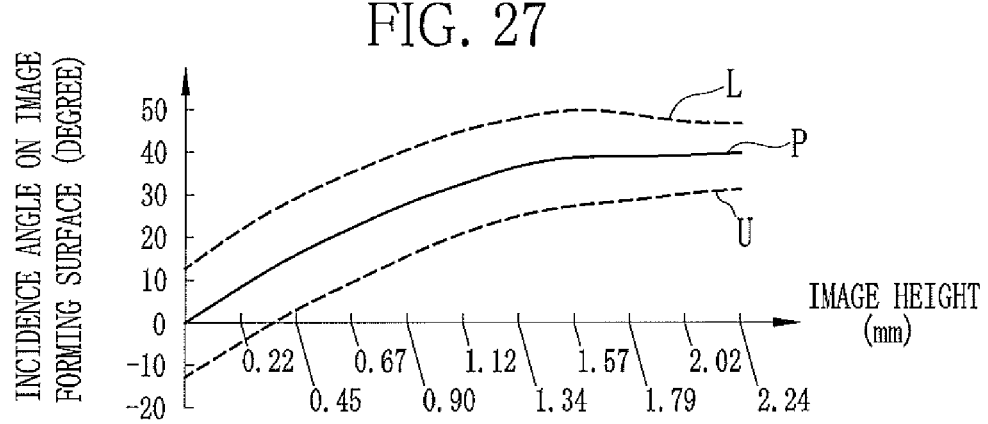
FIG. 27 is a graph showing a relation between an image height on an image forming plane and an incidence angle according to the embodiment 8.
Figure 28A:
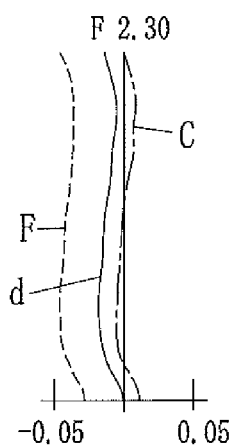
FIG. 28A shows spherical aberration of the image-forming optical system according to the embodiment 8.
Figure 28B:
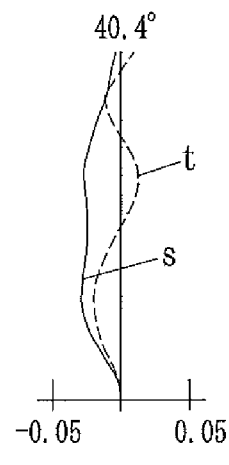
FIG. 28B shows astigmatism of the image-forming optical system according to the embodiment 8.
Figure 28C:
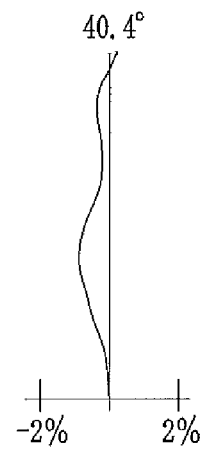
FIG. 28C shows distortion of the image-forming optical system according to the embodiment 8.

The image-forming optical system of the embodiment 8 has the configuration shown in FIG. 26. The lens data and aspheric coefficients are shown in tables 16 and 17, respectively. FIG. 27 shows the graph representing the relation between the image height on the image forming plane and the incidence angle. FIGS. 28A to 28C are aberration diagrams: FIG. 28A shows the spherical aberration diagram; FIG. 28B shows the astigmatism diagram; and FIG. 28C shows the distortion diagram.

TABLE 16

| lens surface number | center radius | distance | refractive index | Abbe number |
|---|---|---|---|---|
| 1 | 0.000 | 0.000 | | |
| 2 | 1.132 | 0.530 | 1.533892 | 55.98 |
| 3 | 4.142 | 0.100 | | |
| aperture stop | 0.000 | 0.270 | | |
| 5 | −4.546 | 0.350 | 1.633463 | 23.44 |
| 6 | −5.092 | 0.263 | | |
| 7 | 7.203 | 0.480 | 1.533892 | 55.98 |
| 8 | −1.283 | 0.281 | | |
| 9 | −0.971 | 0.340 | 1.533892 | 55.98 |
| 10 | 2.729 | 0.474 | | |
| image forming plane | 0.000 | * | | |

TABLE 17

Aspheric coefficients

| lens surface number | K | A(3) | A(4) |
|---|---|---|---|
| 2 | −8.3385175E+00 | 8.5966958E−03 | 7.9726142E−01 |
| 3 | 2.3701209E+00 | 3.3562085E−02 | −2.3323667E−01 |
| aperture stop | | | |
| 5 | 1.6703350E+00 | −1.1247223E−02 | −3.3698619E−01 |
| 6 | 7.0542003E+00 | 6.7504731E−03 | −5.4323177E−01 |
| 7 | −1.0179398E+00 | 2.6369908E−01 | −1.4920108E+00 |
| 8 | −5.3179124E+00 | −1.9211996E−01 | 2.8350969E−01 |
| 9 | −2.4888291E+01 | −1.4423620E+00 | 1.1338184E+01 |
| 10 | −3.3945228E+00 | −6.3392253E−01 | 7.1309912E−01 |

| lens surface number | A(5) | A(6) | A(7) |
|---|---|---|---|
| 2 | −6.0037935E−01 | −1.6971215E−01 | −6.6678205E−01 |
| 3 | 2.7352819E−01 | 8.2768780E−03 | −1.7258687E−01 |
| aperture stop | | | |
| 5 | −4.1813478E−01 | 1.2950581E+00 | −1.8729852E−01 |
| 6 | 2.1630535E−01 | 7.7495772E−01 | −8.1939438E−01 |
| 7 | 1.8701394E+00 | −2.7257601E−01 | −1.6831417E+00 |
| 8 | −1.2642478E+00 | 1.1126797E+00 | 3.9109485E−01 |
| 9 | 8.0214998E−02 | 1.7736374E−02 | −8.3598226E−02 |
| 10 | −2.9723358E−01 | 2.5443473E−02 | 5.5001671E−03 |

| lens surface number | A(8) | A(9) | A(10) |
|---|---|---|---|
| 2 | 1.9594172E+00 | −1.6976972E−01 | −2.4827067E+00 |
| 3 | −1.3373342E+00 | 6.0459077E−01 | 1.8633045E+00 |
| aperture stop | | | |
| 5 | −4.8612066E+00 | 2.9118000E+00 | 5.4400244E+00 |
| 6 | −1.5859630E+00 | 1.0721900E+00 | 2.3079313E+00 |
| 7 | −3.3419511E−01 | 2.6916529E+00 | −1.2980630E+00 |
| 8 | −2.3547373E−01 | −2.1030011E−01 | −9.1509841E−02 |
| 9 | −8.0163751E−02 | 3.1474132E−03 | 2.4266273E−02 |
| 10 | −1.5964804E−02 | 2.1574943E−03 | 3.1804958E−03 |

| lens surface number | A(11) | A(12) | A(13) |
|---|---|---|---|
| 2 | 1.7567786E+00 | 2.9943713E−01 | 5.4252948E−11 |
| 3 | −3.8305110E−01 | −2.1131140E+00 | −2.1870038E−11 |
| aperture stop | | | |
| 5 | −1.1122806E−01 | −5.6755121E+00 | 0.0000000E+00 |
| 6 | 1.4446208E−01 | −1.4069790E+00 | 0.0000000E+00 |
| 7 | 3.0425013E−03 | 3.9413050E−03 | 0.0000000E+00 |
| 8 | 7.2322662E−02 | 2.1773390E−02 | 0.0000000E+00 |
| 9 | 4.0145469E−03 | −2.2662217E−03 | −7.7663723E−04 |
| 10 | 4.3220494E−04 | 3.8750848E−04 | −3.1389660E−05 |

| lens surface number | A(14) | A(15) | A(16) |
|---|---|---|---|
| 2 | −1.3705198E+00 | −3.4992074E−14 | 5.5355197E−01 |
| 3 | 1.8335770E+00 | −3.4992070E−14 | −5.1534819E−01 |

TABLE 17-continued

Aspheric coefficients

| | | | |
|---|---|---|---|
| aperture stop | | | |
| 5 | 3.8815535E+00 | 0.0000000E+00 | −1.5524709E+00 |
| 6 | 7.1242487E−01 | 0.0000000E+00 | −1.9401883E−01 |
| 7 | 5.7650225E−03 | 0.0000000E+00 | −3.3255713E−03 |
| 8 | −2.4707841E−03 | 0.0000000E+00 | 2.7925553E−04 |
| 9 | 1.2891564E−04 | −3.4992060E−14 | 1.6832092E−05 |
| 10 | −2.4623017E−04 | −1.1788361E−10 | 2.3283048E−05 |

In the embodiment 8, the actual total length of the image-forming optical system is 3.087 mm. Since there is no IR cut filter in the image-forming optical system, the total length (actual total length) D is significantly shorter than 3.6 mm. The maximum incidence angle of the principal ray in the peripheral portion of the image forming plane is approximately 38.7° (>33°). As shown in the table 1, the focal length f of the entire image-forming optical system is 2.62 mm. The focal length fL of the last lens G4 is −1.300 mm. The value f/fL is −2.015 (<−1.50), satisfying the predetermined condition. The value D/f is 1.179 and slightly larger than the predetermined value 1.10. However, the image forming performance is excellent and at a sufficiently practical level as shown in aberration diagrams.

Embodiment 9

Figure 29:
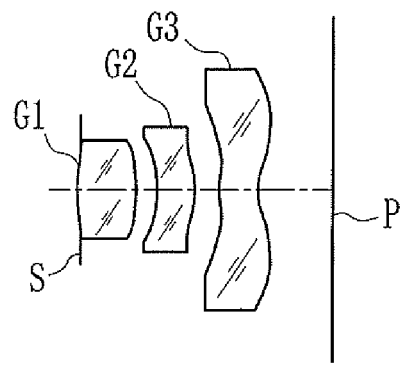
FIG. 29 shows a lens configuration of an image-forming optical system according to an embodiment 9 of the present invention.
Figure 30:
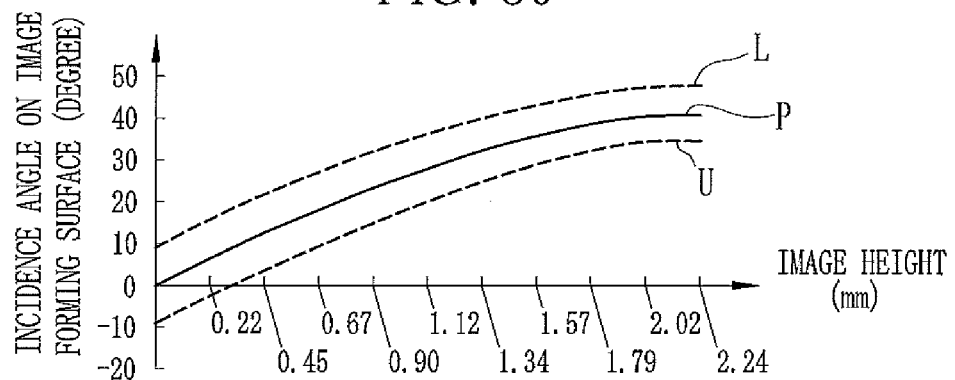
FIG. 30 is a graph showing a relation between an image height on an image forming plane and an incidence angle according to the embodiment 9.
Figure 31A:
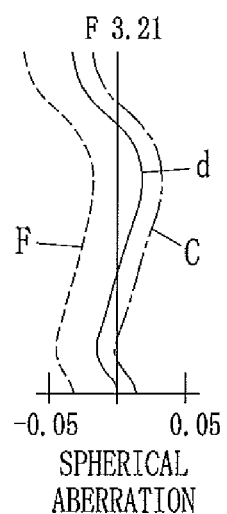
FIG. 31A shows spherical aberration of the image-forming optical system according to the embodiment 9.
Figure 31B:
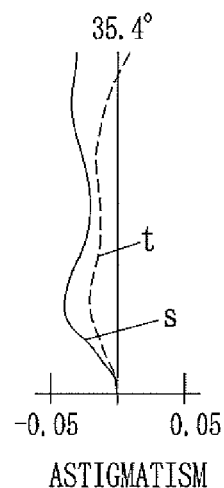
FIG. 31B shows astigmatism of the image-forming optical system according to the embodiment 9.
Figure 31C:
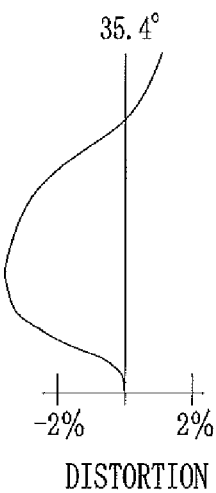
FIG. 31C shows distortion of the image-forming optical system according to an embodiment 9.

The image-forming optical system of the embodiment 9 is composed of three lenses as shown in FIG. 29. The lens data and aspheric coefficients are shown in tables 18 and 19, respectively. FIG. 30 shows the graph representing the relation between the image height on the image forming plane and the incidence angle. FIGS. 31A to 31C are aberration diagrams: FIG. 31A shows the spherical aberration diagram; FIG. 31B shows the astigmatism diagram; and FIG. 31C shows the distortion diagram.

TABLE 18

| lens surface number | center radius | distance | refractive index | Abbe number |
|---|---|---|---|---|
| 1 | 0.000 | 0.000 | | |
| aperture stop | 0.000 | −0.020 | | |
| 3 | 1.473 | 0.777 | 1.53156 | 55.12 |
| 4 | −4.205 | 0.287 | | |
| 5 | −1.475 | 0.485 | 1.605957 | 26.92 |
| 6 | −1.800 | 0.340 | | |
| 7 | 1.610 | 0.485 | 1.53156 | 55.12 |
| 8 | 0.712 | 0.989 | | |
| image forming plane | 0.000 | * | | |

TABLE 19

Aspheric coefficients

| lens surface number | K | A(3) | A(4) |
|---|---|---|---|
| 3 | 5.4662667E+00 | −3.4856921E−02 | −1.3079121E−01 |
| 4 | −3.0908873E−06 | 1.8477177E−01 | −9.7599194E−01 |
| 5 | −8.1491126E+00 | −8.2370032E−02 | −9.7205247E−02 |
| 6 | −4.4228123E+01 | −5.4430099E−02 | −2.4500921E+00 |
| 7 | −3.7047992E+02 | 1.4912258E+00 | −6.7837368E+00 |
| 8 | −4.0065507E+00 | 7.8380925E−02 | −1.6380052E+00 |

TABLE 19-continued

Aspheric coefficients

| lens surface number | A(5) | A(6) | A(7) |
|---|---|---|---|
| 3 | 7.3944405E−01 | −5.6547557E+00 | 6.5115968E+00 |
| 4 | 2.0146693E+00 | −4.1209942E+00 | 7.4302427E+00 |
| 5 | −7.9858599E−02 | −1.5147781E−01 | 7.8523296E−02 |
| 6 | 6.8002838E+00 | −6.1768146E+00 | −3.2403372E−01 |
| 7 | 1.0297716E+01 | −6.3690944E+00 | 2.1129700E−02 |
| 8 | 3.2215616E+00 | −2.9074321E+00 | 1.1919644E+00 |

| lens surface number | A(8) | A(9) | A(10) |
|---|---|---|---|
| 3 | 1.4080017E+01 | −3.4478847E+01 | 1.3556397E+01 |
| 4 | −1.6571739E+01 | 2.2591368E+01 | −1.2073581E+01 |
| 5 | 6.7552462E−01 | 6.8483699E−01 | −2.0011078E+00 |
| 6 | 2.9396123E+00 | 2.0337088E+00 | −2.6927028E+00 |
| 7 | 1.0452092E+00 | 5.2959383E−01 | −4.3266140E−01 |
| 8 | −4.0767028E−02 | −1.2597995E−01 | 2.8685612E−02 |

In the embodiment 9, the actual total length of the image-forming optical system is 3.363 mm. Since there is no IR cut filter in the image-forming optical system, the total length (actual total length) D satisfies the condition D<3.6 mm. The maximum incidence angle of the principal ray in the peripheral portion of the image forming plane is approximately 40.6° (>33°). As shown in the table 1, the focal length f of the entire image-forming optical system is 3.12 mm. The focal length fL of the last lens G3 is −2.074 mm. The value f/fL is −1.054. For the image-forming optical system composed of three lenses, the condition f/fL<−0.9 is sufficient, and thus satisfying the condition. The value D/f is 1.079 satisfying the condition D/f<1.10.

Embodiment 10

The image-forming optical system of the embodiment 10 has the configuration shown in FIG. 32. The lens data and aspheric coefficients are shown in tables 20 and 21, respectively. FIG. 33 shows the graph representing the relation between the image height on the image forming plane and the incidence angle. FIGS. 34A to 34C are aberration diagrams: FIG. 34A shows the spherical aberration diagram; FIG. 34B shows the astigmatism diagram; and FIG. 34C shows the distortion diagram.

TABLE 20

| lens surface number | center radius | distance | refractive index | Abbe number |
|---|---|---|---|---|
| 1 | 0.000 | 0.000 | | |
| 2 | 1.358 | 0.777 | 1.53156 | 55.12 |
| 3 | −6.022 | 0.000 | | |
| aperture stop | 0.000 | 0.384 | | |
| 5 | −1.475 | 0.485 | 1.605957 | 26.92 |
| 6 | −1.697 | 0.146 | | |
| 7 | 1.765 | 0.485 | 1.53156 | 55.12 |
| 8 | 0.768 | 0.980 | | |
| image forming plane | 0.000 | * | | |

TABLE 21

Aspheric coefficients

| lens surface number | K | A(3) | A(4) |
|---|---|---|---|
| 2 | 1.6128794E+00 | −7.8943482E−02 | −3.4373136E−01 |
| 3 | 1.9993134E+01 | 1.0355191E−01 | −1.1740281E+00 |

TABLE 21-continued

Aspheric coefficients

| | | | |
|---|---|---|---|
| aperture stop | | | |
| 5 | −8.1491126E+00 | −8.2370032E−02 | −9.7205247E−02 |
| 6 | −1.0343740E+01 | −1.1170319E−01 | −2.8372931E+00 |
| 7 | −2.5000011E+02 | 1.0963888E+00 | −7.2407711E+00 |
| 8 | −2.3978854E+00 | −2.0663099E−01 | −1.5420007E+00 |

| lens surface number | A(5) | A(6) | A(7) |
|---|---|---|---|
| 2 | 2.6117072E+00 | −7.1560832E+00 | 3.9895468E+00 |
| 3 | 3.8504059E+00 | −6.1408258E+00 | 3.6947733E+00 |
| aperture stop | | | |
| 5 | −7.9858599E−02 | −1.5147781E−01 | 7.8523296E−02 |
| 6 | 7.3308762E+00 | −5.9306670E+00 | −9.7987150E−01 |
| 7 | 1.1569903E+01 | −6.4041570E+00 | −5.2134870E−01 |
| 8 | 3.4965454E+00 | −3.1567794E+00 | 1.1940570E+00 |

| lens surface number | A(8) | A(9) | A(10) |
|---|---|---|---|
| 2 | 1.3340709E+01 | −2.3680648E+01 | 1.1213089E+01 |
| 3 | 4.9720744E+00 | −4.4097346E+01 | 7.0736544E+01 |
| aperture stop | | | |
| 5 | 6.7552462E−01 | 6.8483699E−01 | −2.0011078E+00 |
| 6 | 2.7970908E+00 | 2.8581669E+00 | −2.9955983E+00 |
| 7 | 3.6041576E−01 | 6.0277457E−01 | 2.7739966E−01 |
| 8 | 3.4871122E−03 | −1.2093593E−01 | 2.0204667E−02 |

In the embodiment 10, the actual total length of the image-forming optical system is 3.256 mm. Since there is no IR cut filter in the image-forming optical system, the total length (actual total length) D satisfies the condition D<3.6 mm. The maximum incidence angle of the principal ray in the peripheral portion of the image forming plane is approximately 44.9° (>33°). As shown in the table 1, the focal length f of the entire image-forming optical system is 3.01 mm. The focal length fL of the last lens G3 is −3.081 mm. The value f/fL is −0.977 satisfying the condition f/fL<−0.9. The value D/f is 1.083 satisfying the condition D/f<1.10.

Embodiment 11

Figure 35:
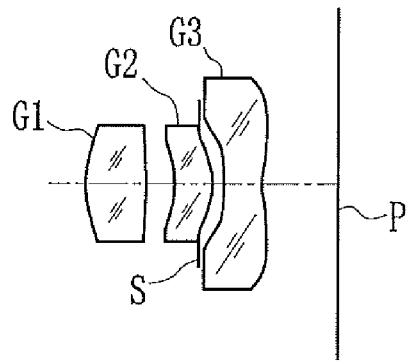
FIG. 35 shows a lens configuration of an image-forming optical system according to an embodiment 11 of the present invention.
Figure 36:
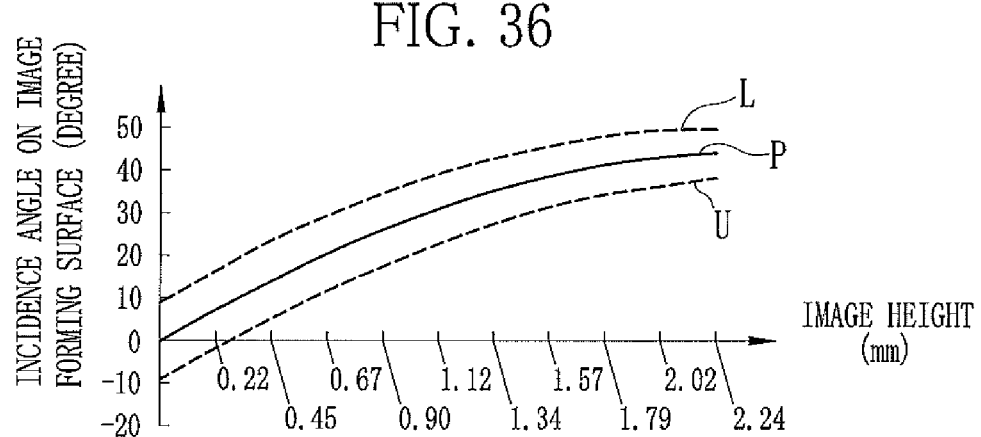
FIG. 36 is a graph showing a relation between an image height on an image forming plane and an incidence angle according to the embodiment 11.
Figure 37A:
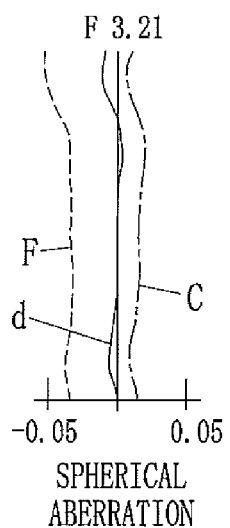
FIG. 37A shows spherical aberration of the image-forming optical system according to the embodiment 11.
Figure 37B:
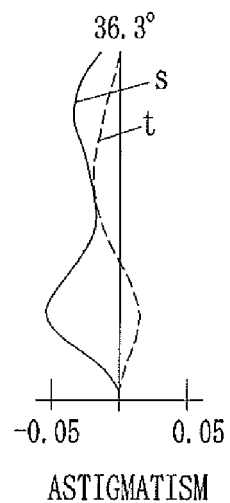
FIG. 37B shows astigmatism of the image-forming optical system according to the embodiment 11.
Figure 37C:
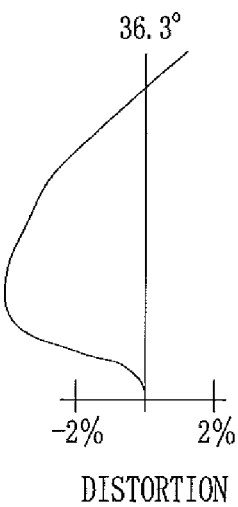
FIG. 37C shows distortion of the image-forming optical system according to an embodiment 11.

The image-forming optical system of the embodiment 11 has the configuration shown in FIG. 35. The lens data and aspheric coefficients are shown in tables 22 and 23, respectively. FIG. 36 shows the graph representing the relation between the image height on the image forming plane and the incidence angle. FIGS. 37A to 37C are aberration diagrams: FIG. 37A shows the spherical aberration diagram; FIG. 37B shows the astigmatism diagram; and FIG. 37C shows the distortion diagram.

TABLE 22

| lens surface number | center radius | distance | refractive index | Abbe number |
|---|---|---|---|---|
| 1 | 0.000 | 0.000 | | |
| 2 | 1.388 | 0.777 | 1.53156 | 55.12 |
| 3 | −5.363 | 0.000 | | |
| aperture stop | 0.000 | 0.384 | | |
| 5 | −1.475 | 0.485 | 1.605957 | 26.92 |
| 6 | −1.564 | 0.146 | | |
| 7 | 1.931 | 0.485 | 1.53156 | 55.12 |
| 8 | 0.751 | 0.980 | | |
| image forming plane | 0.000 | * | | |

TABLE 23

Aspheric coefficients

| lens surface number | K | A(3) | A(4) |
|---|---|---|---|
| 2 | 2.2774601E+00 | −8.7084746E−03 | −6.6899828E−01 |
| 3 | 6.7547384E+00 | 1.2452827E−01 | −1.4023478E+00 |
| aperture stop | | | |
| 5 | −8.1491126E+00 | −8.2370032E−02 | −9.7205247E−02 |
| 6 | −8.3156630E+00 | 4.3553309E−02 | −3.7198998E+00 |
| 7 | −2.7347313E+02 | 8.7871893E−01 | −6.8793268E+00 |
| 8 | −1.9086807E+00 | −3.1251522E−01 | −1.5710027E+00 |

| lens surface number | A(5) | A(6) | A(7) |
|---|---|---|---|
| 2 | 3.0866406E+00 | −7.1986112E+00 | 3.4679779E+00 |
| 3 | 4.4682875E+00 | −6.1906931E+00 | 1.7165286E+00 |
| aperture stop | | | |
| 5 | −7.9858599E−02 | −1.5147781E−01 | 7.8523296E−02 |
| 6 | 9.1605350E+00 | −6.7059795E+00 | −2.8788463E+00 |
| 7 | 1.0856166E+01 | −5.6248696E+00 | 6.1130386E−02 |
| 8 | 3.6927970E+00 | −3.2399291E+00 | 1.1192637E+00 |

| lens surface number | A(8) | A(9) | A(10) |
|---|---|---|---|
| 2 | 1.2563063E+01 | −2.1210498E+01 | 9.6202357E+00 |
| 3 | 4.4055781E+00 | −3.4961076E+01 | 6.1807861E+01 |
| aperture stop | | | |
| 5 | 6.7552462E−01 | 6.8483699E−01 | −2.0011078E+00 |
| 6 | 3.5837087E+00 | 6.1142609E+00 | −5.5541010E+00 |
| 7 | −6.2782416E−01 | −3.9250955E−01 | 1.5144905E+00 |
| 8 | 1.7816658E−02 | −6.5607185E−02 | −4.7375866E−03 |

In the embodiment 11, the actual total length of the image-forming optical system is 3.257 mm. Since there is no IR cut filter in the image-forming optical system, the total length (actual total length) D satisfies the condition D<3.6 mm. The maximum incidence angle of the principal ray in the peripheral portion of the image forming plane is approximately 43.9° (>33°). As shown in the table 1, the focal length f of the entire image-forming optical system is 3.01 mm. The focal length fL of the last lens G3 is −2.702 mm. The value f/fL is −1.114 satisfying the condition f/fL<−0.9. The value D/f is 1.083 satisfying the condition D/f<1.10.

Embodiment 12

Figure 38:
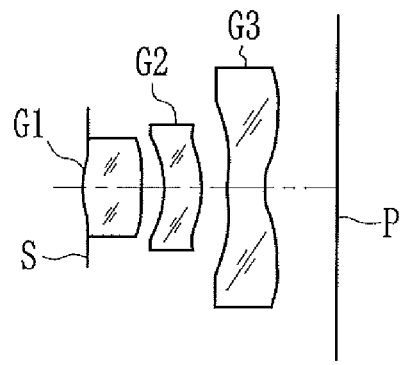
FIG. 38 shows a lens configuration of an image-forming optical system according to an embodiment 12 of the present invention.
Figure 39:
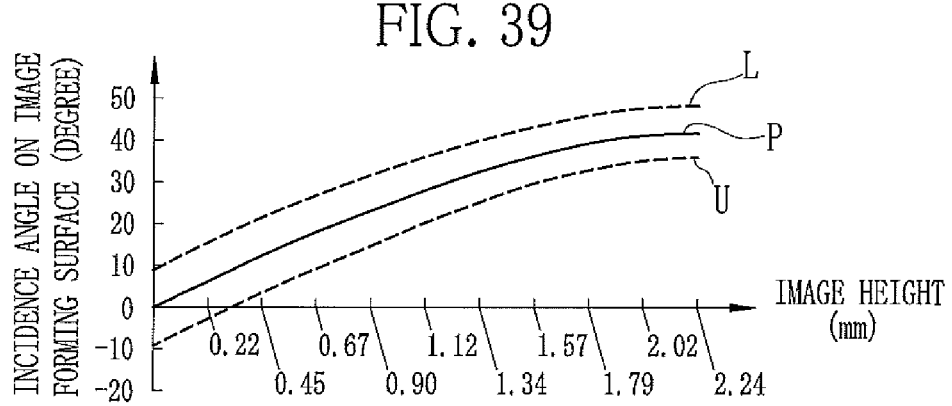
FIG. 39 is a graph showing a relation between an image height on an image forming plane and an incidence angle according to the embodiment 12.
Figure 40A:
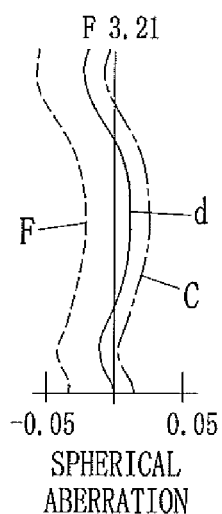
FIG. 40A shows spherical aberration of the image-forming optical system according to the embodiment 12.
Figure 40B:
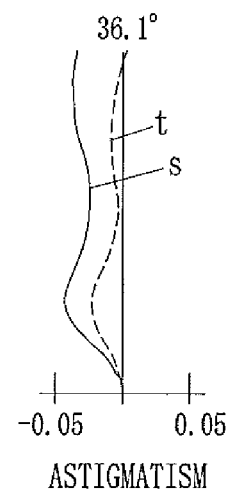
FIG. 40B shows astigmatism of the image-forming optical system according to the embodiment 12.
Figure 40C:
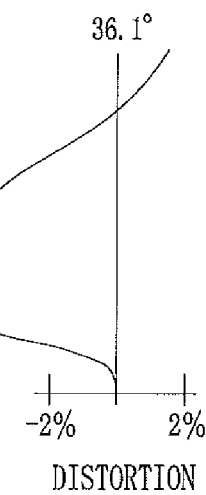
FIG. 40C shows distortion of the image-forming optical system according to the embodiment 12.

The image-forming optical system of the embodiment 12 has the configuration shown in FIG. 38. The lens data and aspheric coefficients are shown in tables 24 and 25, respectively. FIG. 39 shows the graph representing the relation between the image height on the image forming plane and the incidence angle. FIGS. 40A to 40C are aberration diagrams: FIG. 40A shows the spherical aberration diagram; FIG. 40B shows the astigmatism diagram; and FIG. 40C shows the distortion diagram.

TABLE 24

| lens surface number | center radius | distance | refractive index | Abbe number |
|---|---|---|---|---|
| 1 | 0.000 | 0.000 | | |
| aperture stop | 0.000 | −0.020 | | |
| 3 | 1.489 | 0.777 | 1.53156 | 55.12 |
| 4 | −4.722 | 0.287 | | |
| 5 | −1.475 | 0.485 | 1.605957 | 26.92 |

TABLE 24-continued

| lens surface number | center radius | distance | refractive index | Abbe number |
|---|---|---|---|---|
| 6 | −1.657 | 0.340 | | |
| 7 | 1.461 | 0.485 | 1.53156 | 55.12 |
| 8 | 0.673 | 0.965 | | |
| image forming plane | 0.000 | * | | |

TABLE 25

Aspheric coefficients

| lens surface number | K | A(3) | A(4) |
|---|---|---|---|
| 3 | 3.4378784E+00 | −1.9881516E−02 | −1.7597595E−01 |
| 4 | 7.0198265E−06 | 1.9665760E−01 | −1.0271138E+00 |
| 5 | −8.1491126E+00 | −8.2370032E−02 | −9.7205247E−02 |
| 6 | −1.8424038E+01 | 1.2203629E−01 | −2.7300511E+00 |
| 7 | −2.5000001E+02 | 1.6670405E+00 | −7.0105523E+00 |
| 8 | −2.9546863E+00 | −3.8766876E−02 | −1.4093744E+00 |

| lens surface number | A(5) | A(6) | A(7) |
|---|---|---|---|
| 3 | 1.0469151E+00 | −5.4164721E+00 | 6.6086397E+00 |
| 4 | 2.2489820E+00 | −4.3284795E+00 | 7.0373055E+00 |
| 5 | −7.9858599E−02 | −1.5147781E−01 | 7.8523296E−02 |
| 6 | 6.8890059E+00 | −6.1695268E+00 | −3.0725066E−01 |
| 7 | 1.0372272E+01 | −6.2987924E+00 | −1.8315011E−02 |
| 8 | 3.0127377E+00 | −2.7991767E+00 | 1.1670350E+00 |

| lens surface number | A(8) | A(9) | A(10) |
|---|---|---|---|
| 3 | 1.3162915E+01 | −3.8894532E+01 | 2.3646319E+01 |
| 4 | −1.5434794E+01 | 2.1385922E+01 | −1.1675751E+01 |
| 5 | 6.7552462E−01 | 6.8483699E−01 | −2.0011078E+00 |
| 6 | 2.8950618E+00 | 1.8803660E+00 | −2.4652304E+00 |
| 7 | 1.0306667E+00 | 4.7162044E−01 | −3.8498325E−01 |
| 8 | −4.6766719E−02 | −1.2158350E−01 | 2.8562847E−02 |

In the embodiment 12, the actual total length of the image-forming optical system is 3.339 mm. Since there is no IR cut filter in the image-forming optical system, the total length (actual total length) D satisfies the condition D<3.6 mm. The maximum incidence angle of the principal ray in the peripheral portion of the image forming plane is approximately 41.6° (>33°). As shown in the table 1, the focal length f of the entire image-forming optical system is 3.02 mm. The focal length fL of the last lens G3 is −2.987 mm. The value f/fL is −1.011 satisfying the condition f/fL<−0.9. The value D/f is 1.105 and slightly larger than the predetermined value 1.10. However, the image forming performance is at a practical level as shown in aberration diagrams.

Embodiment 13

Figure 41:
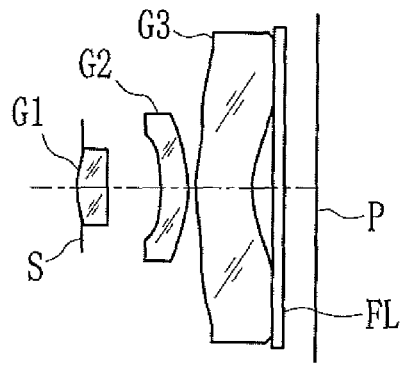
FIG. 41 shows a lens configuration of an image-forming optical system according to an embodiment 13 of the present invention.
Figure 42:
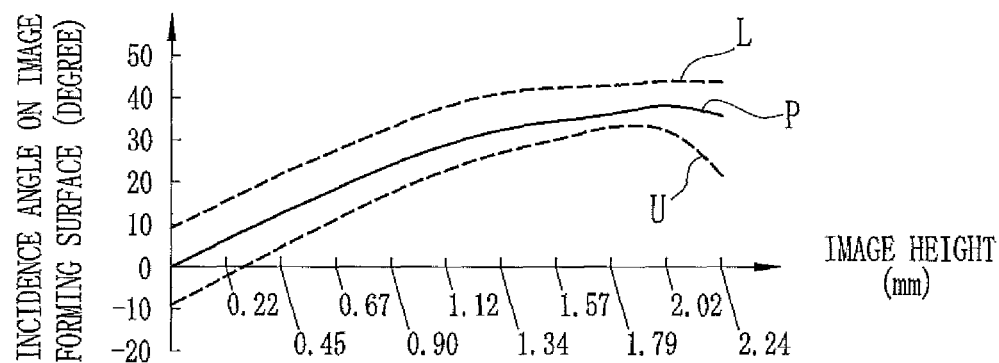
FIG. 42 is a graph showing a relation between an image height on an image forming plane and an incidence angle according to the embodiment 13.
Figure 43A:
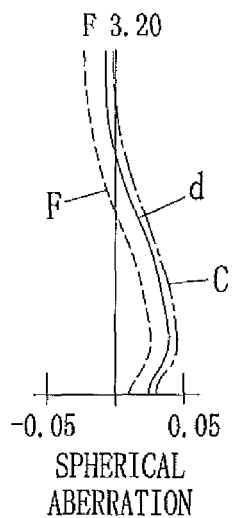
FIG. 43A shows spherical aberration of the image-forming optical system according to the embodiment 13.
Figure 43B:
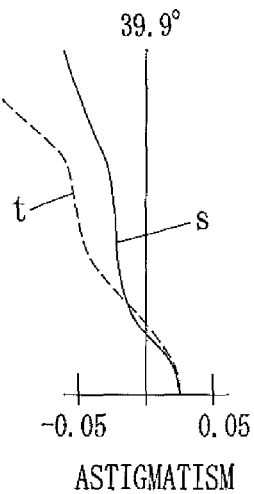
FIG. 43B shows astigmatism of the image-forming optical system according to the embodiment 13.
Figure 43C:
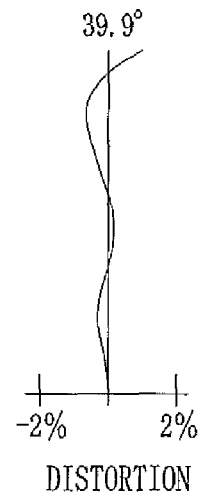
FIG. 43C shows distortion of the image-forming optical system according to the embodiment 13.

The image-forming optical system of the embodiment 13 has the configuration shown in FIG. 41. The lens data and aspheric coefficients are shown in tables 26 and 27, respectively. FIG. 42 shows the graph representing the relation between the image height on the image forming plane and the incidence angle. FIGS. 43A to 43C are aberration diagrams: FIG. 43A shows the spherical aberration diagram; FIG. 43B shows the astigmatism diagram; and FIG. 43C shows the distortion diagram.

TABLE 26

| lens surface number | center radius | distance | refractive index | Abbe number |
|---|---|---|---|---|
| 1 | 0.000 | 0.000 | | |
| aperture stop | 1.349 | 0.380 | 1.533914 | 55.89 |
| 3 | 18.027 | 0.700 | | |
| 4 | −1.840 | 0.363 | 1.613986 | 25.48 |
| 5 | −2.451 | 0.127 | | |
| 6 | 1.369 | 0.747 | 1.533914 | 55.89 |
| 7 | 1.031 | 0.279 | | |
| 8 | 0.000 | 0.145 | 1.51633 | 64.14 |
| 9 | 0.000 | 0.474 | | |
| 10 image forming plane | 0.000 | * | | |

TABLE 27

Aspheric coefficients

| surface lens number | K | A(3) | A(4) |
|---|---|---|---|
| 3 | −1.9825020E+00 | −1.7338997E−01 | 9.9220050E−01 |
| 4 | 9.8588801E+00 | −3.5735244E−02 | 3.5696308E−02 |
| 5 | −2.4791126E+01 | 7.1672577E−02 | −7.2300749E−01 |
| 6 | −8.8265946E+00 | −4.0999058E−01 | 9.7281698E−01 |
| 7 | 2.5043886E−01 | −3.0420972E−01 | −2.7816642E−01 |
| 8 | 1.3101817E−01 | 8.6692526E−02 | −1.0351410E+00 |

| surface lens number | A(5) | A(6) | A(7) |
|---|---|---|---|
| 3 | −2.3978015E+00 | 3.7973273E+00 | −3.2278649E+00 |
| 4 | 5.9793979E−02 | −4.8416637E+00 | 1.8287214E+01 |
| 5 | 6.7909845E−01 | 2.0178068E+00 | 1.1149254E+01 |
| 6 | −1.4353981E+00 | 1.6575850E+00 | −5.7258736E−01 |
| 7 | 3.0222586E−01 | 3.2191516E−05 | −6.7221914E−03 |
| 8 | 1.1089668E+00 | −4.9329335E−01 | −2.3657255E−02 |

| surface lens number | A(8) | A(9) | A(10) |
|---|---|---|---|
| 3 | −1.5458090E+01 | 4.7516755E+01 | −3.7677740E+01 |
| 4 | −3.9392106E+01 | 4.9379963E+01 | −2.6103867E+01 |
| 5 | −7.7975572E+01 | 1.3764356E+02 | −8.1514030E+01 |
| 6 | −1.5274548E−01 | −1.1729791E+00 | 1.0372084E+00 |
| 7 | −5.2596212E−02 | 2.6787085E−02 | −3.5408125E−03 |
| 8 | 1.1039464E−01 | −3.6476942E−02 | 3.2713766E−03 |

In the embodiment 13, the actual total length of the image-forming optical system is 3.216 mm. The image-forming optical system includes the IR cut filter. When the thickness of the IR cut filter is converted into its equivalent air distance, the total length D is 3.166 mm, which satisfies the condition D<3.6 mm. The maximum incidence angle of the principal ray in the peripheral portion of the image forming plane is approximately 36.0° (>33°). As shown in the table 1, the focal length f of the entire image-forming optical system is 2.72 mm. The focal length fL of the last lens G3 is −33.60 mm. The value f/fL is −0.081 and does not satisfy the condition f/fL<−0.90. The value D/f is 1.164 and does not satisfy the condition D/f<1.10. However, the imaging performance is at a practical level as shown in aberration diagrams.

Embodiment 14

Figure 44:
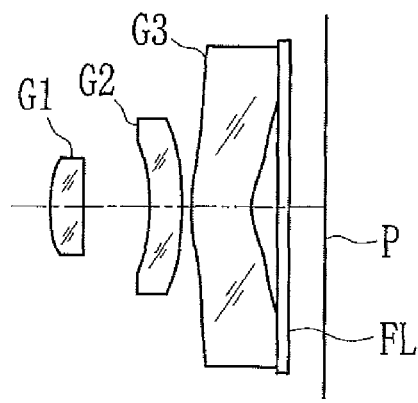
FIG. 44 shows a lens configuration of an image-forming optical system according to an embodiment 14 of the present invention.
Figure 45:
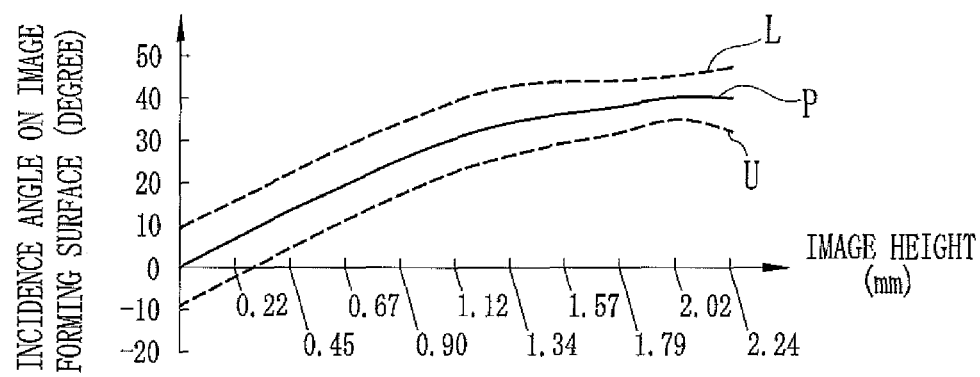
FIG. 45 is a graph showing a relation between an image height on an image forming plane and an incidence angle according to the embodiment 14.
Figure 46A:
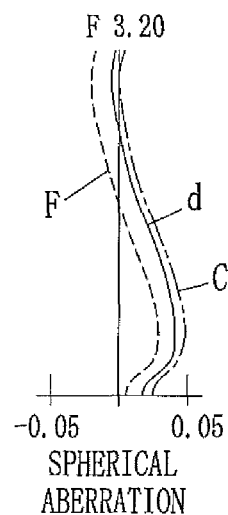
FIG. 46A shows spherical aberration of the image-forming optical system according to the embodiment 14.
Figure 46B:
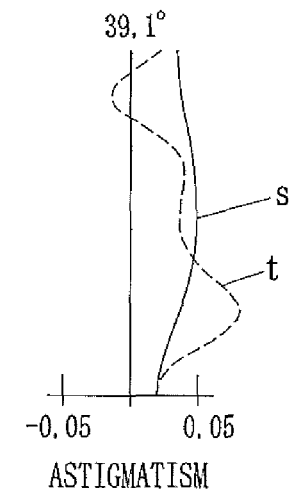
FIG. 46B shows astigmatism of the image-forming optical system according to the embodiment 14.
Figure 46C:
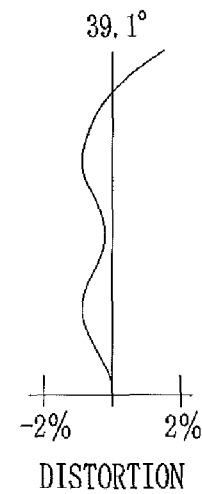
FIG. 46C shows distortion of the image-forming optical system according to the embodiment 14.

The image-forming optical system of the embodiment 14 has the configuration shown in FIG. 44. The lens data and aspheric coefficient are shown in tables 28 and 29, respectively. In this embodiment, it is difficult to depict the aperture stop because the aperture stop substantially coincides with the surface of the first lens G1 on the image-forming plane side, so the illustration of the aperture stop is omitted in FIG. 44. FIG. 45 shows the graph representing the relation between the image height on the image forming plane and the incidence angle. FIGS. 46A to 46C are aberration diagrams: FIG. 46A shows the spherical aberration diagram; FIG. 46B shows the astigmatism diagram; and FIG. 46C shows the distortion diagram.

TABLE 28

| lens surface number | center radius | distance | refractive index | Abbe number |
|---|---|---|---|---|
| 1 | 0.000 | 0.000 | | |
| 2 | 1.504 | 0.385 | 1.533914 | 55.89 |
| 3 | 33.077 | 0.000 | | |
| aperture stop | 0.000 | 0.791 | | |
| 5 | −3.833 | 0.375 | 1.613986 | 25.48 |
| 6 | −8.479 | 0.127 | | |
| 7 | 1.198 | 0.714 | 1.533914 | 55.89 |
| 8 | 0.997 | 0.289 | | |
| 9 | 0.000 | 0.145 | 1.51633 | 64.14 |
| 10 | 0.000 | 0.463 | | |
| image forming plane | 0.000 | * | | |

TABLE 29

Aspheric coefficients

| lens surface number | K | A(3) | A(4) |
|---|---|---|---|
| 2 | −1.9547351E+00 | −1.8443331E−01 | 9.7195412E−01 |
| 3 | −8.6115066E+00 | −3.3021870E−02 | −1.6236418E−01 |
| aperture stop | | | |
| 5 | −2.1694172E+01 | −1.7468628E−01 | 2.9030912E−02 |
| 6 | −1.0078697E+01 | −6.9947467E−01 | 2.0439025E+00 |
| 7 | 1.9059696E−01 | −3.2177908E−01 | −2.9254081E−01 |
| 8 | 1.0705782E−01 | 8.2737913E−02 | −1.0357918E+00 |

| lens surface number | A(5) | A(6) | A(7) |
|---|---|---|---|
| 2 | −2.4912501E+00 | 3.7450373E+00 | −2.4631855E+00 |
| 3 | 6.3585388E−01 | −4.5698697E+00 | 1.7171461E+01 |
| aperture stop | | | |
| 5 | 5.0414687E+00 | −2.2059021E+01 | 5.1043345E+01 |
| 6 | −2.9842299E+00 | 2.0980891E+00 | 5.3451583E−02 |
| 7 | 2.9898058E−01 | 8.3030031E−04 | −5.1956058E−03 |
| 8 | 1.1071633E+00 | −4.9285370E−01 | −2.3070408E−02 |

| lens surface number | A(8) | A(9) | A(10) |
|---|---|---|---|
| 2 | −1.3728969E+01 | 3.9457496E+01 | −3.0550112E+01 |
| 3 | −4.1487610E+01 | 4.9639536E+01 | −1.8292258E+01 |
| aperture stop | | | |
| 5 | −7.9125169E+01 | 7.5278708E+01 | −3.2300894E+01 |
| 6 | −9.0704682E−02 | −1.4075608E+00 | 8.9438762E−01 |
| 7 | −5.1557843E−02 | 2.7059433E−02 | −3.9425025E−03 |
| 8 | 1.1066918E−01 | −3.6440457E−02 | 3.2029530E−03 |

In the embodiment 14, the actual total length of the image-forming optical system is 3.289 mm. The image-forming optical system includes the IR cut filter. When the thickness of the IR cut filter is converted into its equivalent air distance, the total length D is 3.24 mm, which satisfies the condition D<3.6 mm. The maximum incidence angle of the principal ray in the peripheral portion of the image forming plane is approximately 40.4° (>33°). As shown in the table 1, the focal length f of the entire image-forming optical system is 2.77 mm. The focal length fL of the last lens G3 is 46.95 mm. The value f/fL is 0.059 and does not satisfy the condition f/fL<−0.9. The value D/f is 1.171 and does not satisfy the condition D/f<1.10. However, the imaging performance is at a practical level as shown in aberration diagrams.

Various changes and modifications are possible in the present invention and may be understood to be within the present invention.

What is claimed is:

1. An imaging device comprising:
   an image-forming optical system composed of two or more lenses; and
   a solid state image sensor for capturing an image formed on an image forming plane of the image-forming optical system;
   wherein, a total length of the image-forming optical system is less than 3.6 mm, and a maximum incidence angle of a principal ray incident on the image forming plane exceeds 33°.

2. The imaging device of claim 1, wherein f/fL<−1.50 is satisfied where f denotes a focal length of the entire image-forming optical system and fL denotes a focal length of a last lens.

3. The imaging device of claim 1, wherein sensitivity of the solid state image sensor is greater than or equal to 20% when light is incident on its incident surface at incidence angles of ±30°, relative to sensitivity to normal incident light, and the incident surface is determined by the image forming plane of the image-forming optical system.

4. The imaging device of claim 3, wherein the solid state imaging device is sensitive in visible light range and non-sensitive in an IR range.

5. The imaging device of claim 1, wherein a photoelectric conversion portion is composed of an organic photoelectric conversion layer.

6. The imaging device of claim 1, wherein the solid state image sensor is of a back side illumination type.

7. The imaging device of claim 1, wherein the image-forming optical system does not include an IR cut filter.

8. A mobile information terminal having the imaging device of claim 1.

9. The imaging device of claim 1, wherein the maximum incidence angle of the principal ray incident on the image forming plane exceeds 45°.

10. The imaging device of claim 1, wherein the total length is about 3.3 mm.

11. The imaging device of claim 1, wherein the total length is about 3.3 mm.

12. An imaging device comprising:
    an image-forming optical system composed of two or more lenses; and
    a solid state image sensor for capturing an image formed on an image forming plane of the image-forming optical system;
    wherein, a total length D of the image-forming optical system is less than 3.6 mm, and D/f<1.10 is satisfied where f denotes a focal length of the entire image-forming optical system.

13. The imaging device of claim 12, wherein f/fL<−0.90 is satisfied where fL denotes a focal length of a last lens.

14. The imaging device of claim 13, wherein the image-forming optical system is composed of three lenses including the last lens being a negative lens.

15. The imaging device of claim 12, wherein f/fL<−1.50 is satisfied where fL denotes a focal length of a last lens.

16. The imaging device of claim 15, wherein the image-forming optical system is composed of four lenses including the last lens being a negative lens.

17. The imaging device of claim 12, wherein the total length D is 3.5 mm.

18. An imaging device comprising:
    an image-forming optical system composed of two or more lenses; and
    a solid state image sensor for capturing an image formed on an image forming plane of the image-forming optical system;
    wherein, f/fL<−1.5 and D/f<1.10 are satisfied where D denotes a total length of the image-forming optical system, and f denotes a focal length of the entire image-forming optical system, and fL denotes a focal length of a last lens.

* * * * *